(12) United States Patent
Furuya et al.

(10) Patent No.: US 7,583,431 B2
(45) Date of Patent: Sep. 1, 2009

(54) WAVELENGTH CONVERSION OPTICAL DEVICE, LASER LIGHT SOURCE, AND IMAGE DISPLAY OPTICAL DEVICE

(75) Inventors: Hiroyuki Furuya, Nara (JP); Kiminori Mizuuchi, Osaka (JP); Akihiro Morikawa, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 154 days.

(21) Appl. No.: 11/884,885

(22) PCT Filed: Feb. 22, 2006

(86) PCT No.: PCT/JP2006/303129

§ 371 (c)(1),
(2), (4) Date: Aug. 22, 2007

(87) PCT Pub. No.: WO2006/090721

PCT Pub. Date: Aug. 31, 2006

(65) Prior Publication Data

US 2008/0158638 A1   Jul. 3, 2008

(30) Foreign Application Priority Data

Feb. 25, 2005 (JP) ............................. 2005-050416

(51) Int. Cl.
*G02F 2/02* (2006.01)
*H01S 3/10* (2006.01)
*H01S 3/30* (2006.01)

(52) U.S. Cl. ......................... 359/326; 359/328; 372/6; 372/21; 372/22

(58) Field of Classification Search ......... 359/326–332; 372/6, 21, 22; 385/122
See application file for complete search history.

(56) References Cited

U.S. PATENT DOCUMENTS

2004/0240492 A1   12/2004   Kojima et al. ................. 372/21
2007/0201125 A1*  8/2007    Blau et al. .................... 359/326
2007/0297465 A1*  12/2007   Yumoto et al. ................ 372/21
2008/0075130 A1*  3/2008    Mizuuchi et al. .............. 372/6

FOREIGN PATENT DOCUMENTS

| JP | 2-266335   | 10/1990 |
| JP | 4-63336    | 2/1992  |
| JP | 5-259558   | 10/1993 |
| JP | 9-152639   | 6/1997  |
| JP | 11-271823  | 10/1999 |
| JP | 2001-21931 | 1/2001  |
| JP | 2002-329912| 11/2002 |

* cited by examiner

*Primary Examiner*—Hemang Sanghavi
(74) *Attorney, Agent, or Firm*—Steptoe & Johnson LLP

(57) ABSTRACT

A wavelength conversion optical device is provided with a fundamental wave light source (301) which outputs a fundamental wave (L11) including a P polarized light and an S polarized light that are perpendicular to each other, and two wavelength conversion mechanisms (303a, 303b) each having a polarization inversion formation part which wavelength-converts the fundamental wave (L11) to generate harmonic waves, and the first-stage wavelength conversion mechanism (303a) performs wavelength conversion of the P polarized light of the fundamental wave (L11) while the second-stage wavelength conversion mechanism (303b) performs wavelength conversion of the S polarized light of the fundamental wave (L11), whereby absorption of a second harmonic wave (green light) due to a third harmonic wave (ultraviolet light) is reduced, and stability and reliability of the wavelength-converted light output are enhanced, thereby providing a wavelength conversion optical device which can output a wavelength-converted light capable of improving the image quality of the displayed image.

11 Claims, 14 Drawing Sheets spectrum of fundamental wavelength

US 7,583,431 B2

WAVELENGTH CONVERSION OPTICAL DEVICE, LASER LIGHT SOURCE, AND IMAGE DISPLAY OPTICAL DEVICE

The present application is based on International Application PCT/JP2006/303129, filed Feb. 22, 2006, which claims priority to Japanese Patent Application No. 2005-050416, filed Feb. 25, 2005, the entire contents of which are hereby incorporated by reference.

TECHNICAL FIELD

The present invention relates to a wavelength conversion optical device using a quasi phase matching wavelength conversion element, and a laser light source and an image display optical device which utilize the wavelength conversion optical device.

BACKGROUND ART

As a light source to be used for a processing application or a laser display, a high-power laser light source is attracting attention. In an infrared area thereof, a solid laser such as a YAG laser, and a fiber laser using a fiber to which a rare earth such as Yb or Nd is applied are developed. On the other hand, in red and blue areas, a semiconductor laser using GaAs, GaN, or the like is developed, and an increase in output power thereof is also considered. However, as for a green area, it is still difficult to generate green color directly from a semiconductor, and it is general to obtain green color by wavelength-converting an infrared light emitted from the above-mentioned solid laser or fiber laser by using a non-linear optical crystal.

Particularly when lithium niobate ($LiNbO_3$:LN) crystal is used as the non-linear optical crystal, a high conversion efficiency can be obtained because of a large non-linear optical constant of the crystal, and the construction of the device is simplified. Therefore, a quasi phase matching (QPM) wavelength conversion element that is formed by applying a polarization inversion technique to the lithium niobate crystal is often used for a wavelength conversion optical device having an output power of about hundred mW.

In a wavelength conversion optical device having an output power of several W class, a non-linear optical crystal such as lithium triborate ($LiB_3O_5$:LBO) crystal or potassium titanyl phosphate ($KTiOPO_4$:KTP) crystal is used. The LBO crystal has such characteristics that crystal destruction or deterioration due to a fundamental wave or a generated second harmonic wave hardly occurs. However, since the non-linear optical constant of the LBO crystal is small, it is necessary to constitute a resonator and place the crystal in the resonator to achieve high conversion efficiency of the wavelength conversion optical device, and thus the device constitution is complicated and minute control is required. On the other hand, since the KTP crystal has a non-linear optical constant larger than that of the LBO crystal, high conversion efficiency of the device can be achieved without constituting a resonator. The KTP crystal, however, has such drawback that crystal destruction or deterioration due to a fundamental wave or a generated second harmonic wave easily occurs.

By the way, since the quasi phase matching element using the LN crystal (QPM-LN element) has a larger non-linear optical constant than that in the case of using the KTP crystal, it enables high-efficiency and high-power wavelength conversion. However, since the QPM-LN element is required to concentrate light energy to a narrow region, substantially, crystal destruction or deterioration due to a fundamental wave or a generated second harmonic occurs more likely in the LN crystal than in the KTP crystal. That is, when a harmonic wave of several watts (W) is obtained by the QPM-LN element, the large non-linear optical constant of the LN crystal causes that an ultraviolet light (third harmonic wave) which is a sum frequency of an infrared light as a fundamental wave and a wavelength-converted green light (second harmonic wave) occurs even when the phase matching condition is not satisfied, and the generated ultraviolet light (third harmonic wave) induces absorption of the generated green light (second harmonic wave), leading to saturation of the green light output, and crystal destruction.

In order to solve this problem, it is proposed that a non-linear optical crystal for waveform conversion is constituted in two stages, and a fundamental wave that is not converted by the first-stage wavelength conversion is again used in the second-stage wavelength conversion, as described in Patent Document 1 and Patent Document 2. In this case, total conversion efficiency can be increased by the first-stage and second-stage wavelength conversions, and further, interaction between the fundamental wave component and the second harmonic wave component can be reduced to suppress generation of the third harmonic wave that is ultraviolet light.

Patent Document 1: Japanese Published Patent Application No. Hei.11-271823

Patent Document 2: Japanese Published Patent Application No. 2005-10739

DISCLOSURE OF THE INVENTION

Problems to be Solved by the Invention

Hereinafter, the construction of the conventional wavelength conversion optical device described in Patent Document 1 will be described with reference to FIG. 14. The conventional wavelength conversion optical device 100 wavelength-converts a fundamental wave light L1 that is emitted from a fundamental wave light source 101 by a first-stage wavelength converter 102a to generate a second harmonic wave. The first-stage wavelength converter 102a outputs a light L2 including the second harmonic wave generated in the wavelength converter 102a and the fundamental wave light that is not converted by the wavelength converter 102a (residual fundamental wave light). The light L2 is separated into the second harmonic wave L2a and the residual fundamental wave L2b by a separation mirror 103a that transmits the fundamental wave and reflects the harmonic wave. Then, the residual fundamental wave L2b that has passed through the separation mirror 103a is beam-shaped by a beam diameter conversion mechanism 104, and again wavelength-converted by a second-stage wavelength converter 102b. The second-stage wavelength converter 102b outputs a light L3 including the second harmonic wave that is converted by the wavelength converter 102b and the residual fundamental wave that is not converted by the wavelength converter 102b. The light L3 is separated into the second harmonic wave L3a and the residual fundamental wave L3b by a separation mirror 103b.

In the construction of Patent Document 1, however, when the wavelength conversion efficiency of the first-stage wavelength converter 102a becomes unstable, the input of the fundamental wave incident on the second-stage wavelength converter 102b varies and thereby the output from the converter 102b also becomes unstable. That is, the output stability of the second-stage wavelength converter 102b considerably depends on the output stability of the first-stage wavelength converter 102a. Further, when the output of the first-stage wavelength converter 102a significantly decreases, the fundamental wave input to the second-stage wavelength converter 102b rapidly increases, leading to destruction of the crystal. These problems make control of wavelength conversion in the device of Patent Document 1 difficult, and cause reduction in the output stability during the wavelength conversion operation.

Further, Patent Document 1 also has a problem that the beam quality of the residual fundamental wave L2b passing through the first-stage wavelength converter 102b is degraded (transverse mode distortion). The degradation in the beam quality (transverse mode distortion) cannot be removed even when the beam passes through the beam diameter conversion mechanism 104. The degradation in the beam quality (transverse mode distortion) is not likely to occur when angle phase matching is used as a method for phase-matching the fundamental wave and the second harmonic wave. However, when using an element of a polarization inversion structure which has a high conversion efficiency as a wavelength conversion element but has a small area effective to wavelength conversion, as in Patent Document 1, transverse mode distortion is likely to occur due to refractive index distortion or the like in the polarization inversion part, leading to a reduction in the conversion efficiency.

Further, since the construction of Patent Document 2 has no mechanism for separating the second harmonic wave, it cannot avoid absorption of the second harmonic wave (green light) that is induced by the third harmonic wave (ultraviolet light), which is the problem of this time.

By the way, it has been known that, when a laser light source having a single wavelength and a single polarization is used for performing image display using an image display device, unnecessary noise (speckle noise) occurs, and the quality of a displayed image is degraded. However, in order to achieve highly efficient wavelength conversion using a laser light source, it is an indispensable condition that the laser light source has a single wavelength and a single polarization. That is, in order to realize a wavelength conversion optical device for a high-luminance image display device, a light source that satisfies both of the above-mentioned conditions must be developed.

The present invention has an object to provide a wavelength conversion optical device which can reduce influence of second harmonic wave absorption due to a third harmonic wave, increase stability and reliability of wavelength converted light output, and output wavelength-converted light that realizes high-quality image display, and furthermore, a laser light source and an image display optical device using the wavelength conversion optical device.

Measures to Solve the Problems

In order to solve the above-mentioned problems, a wavelength conversion optical device of the present invention includes a fundamental wave light source for outputting a fundamental wave light, and a wavelength conversion mechanism including a polarization inversion unit for wavelength-converting the fundamental wave light emitted from the fundamental wave light source to generate harmonic waves, wherein the fundamental wave light source is a fiber laser light source which outputs a fundamental wave light having polarized light components in two directions perpendicular to each other, which polarized light components have different wavelengths, and the wavelength conversion mechanism wavelength-converts the fundamental wave light for each of polarized light components in two directions perpendicular to each other.

Thereby, saturation of the harmonic wave outputs and destruction of crystal are avoided, and output stability and reliability of the wavelength-converted harmonic waves are enhanced.

Further, in the wavelength conversion optical device of the present invention, an oscillation wavelength of the fundamental wave light differs between the polarized light components in the two directions.

Thereby, output stability and reliability of the wavelength-converted harmonic waves are further enhanced.

Further, in the wavelength conversion optical device of the present invention, the two harmonic wave lights emitted from the wavelength conversion mechanism have the same polarization direction.

Further, in the wavelength conversion optical device of the present invention, the two harmonic wave lights emitted from the wavelength conversion mechanism have polarization directions that are perpendicular to each other.

Further, the wavelength conversion optical device of the present invention includes a polarized light separation mechanism for separating the fundamental wave light, or a light including the fundamental wave light and the harmonic waves that are wavelength-converted by the wavelength conversion mechanism, for each of the polarized light components of the light.

Thereby, the fundamental wave light emitted from the fundamental wave light source can be divided into the respective polarized light components.

Further, in the wavelength conversion optical device of the present invention, the wavelength conversion mechanism includes, within the same substrate of the wavelength conversion mechanism, the polarization inversion unit, a first reflection mirror which is provided on a fundamental wave light incident side of the polarization inversion unit and transmits the fundamental wave light, a second reflection mirror which is provided on an emission side of the harmonic waves that are wavelength-converted by the polarization inversion unit and transmits the harmonic waves, a wavelength plate which converts the polarization of the fundamental wave that has passed through the polarization inversion unit, and two temperature control mechanisms which control the temperature of the polarization inversion unit.

Thereby, the device can be further miniaturized.

Further, in the wavelength conversion optical device of the present invention, the polarization inversion unit of the wavelength conversion mechanism is formed by polarization-inverting at least a portion of lithium niobate ($LiNbO_3$:LN) or lithium tantalate ($LiTaO_3$:LT) to which MgO or ZnO are doped.

Thereby, higher-conversion efficiency can be achieved in the aforementioned device.

Further, an image display optical device of the present invention includes a wavelength conversion optical device as defined in any of claims 1 to 7, modulation mechanisms for modulating the two harmonic waves that are converted and emitted by the wavelength conversion optical device, respectively, and a projection optical system for projecting the lights modulated by the modulation mechanism.

Thereby, an image display optical device that can reduce speckle noise is provided. More preferably, when the wavelength conversion optical device defined in claim 2 or claim 4 is used in the image display optical device, further reduction in speckle noise can be achieved.

Further, a laser light source of the present invention has a wavelength conversion optical device as defined in any of claims 1 to 7.

Thereby, it is possible to provide a laser light source which can avoid saturation of the harmonic wave outputs and destruction of crystal as well as enhance the output stability and reliability of the harmonic waves that are independently wavelength-converted.

Further, in the wavelength conversion optical device defined in claim 1. in a light emitted from the device, beams having respective wavelength components are not emitted coaxially to each other.

Thereby, two lights of different wavelengths are emitted from different positions to enhance the resolution of image.

Further, an image display optical device of the present invention includes the wavelength conversion optical device defined in claim 10.

Thereby, it is possible to provide an image display optical device that can reduce speckle noise.

EFFECTS OF THE INVENTION

A wavelength conversion optical device or a laser light source according to the present invention is provided with a fundamental wave light source for outputting a fundamental wave light, and a wavelength conversion mechanism including a polarization inversion unit for wavelength-converting the fundamental wave light emitted from the fundamental wave light source to generate harmonic waves, and the fundamental wave light source is a fiber laser light source which outputs a fundamental wave light having polarized light components in two directions perpendicular to each other, which polarized light components have different wavelengths, and the wavelength conversion mechanism wavelength-converts the fundamental wave light for each of the polarized light components in the two directions perpendicular to each other. Thereby, interaction between the fundamental wave component and the second harmonic wave component is reduced, and occurrence of a third harmonic wave (ultraviolet light) is suppressed. Therefore, absorption of the second harmonic wave (green light) which is caused by the third harmonic wave is suppressed, and thereby saturation of the output in the wavelength conversion mechanism and crystal destruction can be avoided, and furthermore, stability and reliability of the second harmonic wave outputted from the device can be enhanced.

Furthermore, in a constitution where the wavelength conversion optical device or the laser light source is designed to divide the polarization state of the fundamental wave emitted from the fundamental wave light source into two directions with an arbitrary optical power ratio, and thereafter, carry out wavelength conversion for the fundamental wave lights of the divided polarized lights by using the wavelength conversion mechanism, it is possible to suppress a reduction in conversion efficiency that is caused by degradation in beam quality (transverse mode distortion) in the wavelength conversion mechanism, thereby achieving high conversion efficiency in the device.

Furthermore, in the wavelength conversion optical device or the laser light source according to the present invention, when the fundamental wave light source is constituted so as to emit a fundamental wave light having polarized light components in two directions having different wavelengths, the respective polarized light components of the fundamental wave light can be independently wavelength-converted with higher reliability by the wavelength conversion mechanism, and thereby stability and reliability of the second harmonic wave outputted from the device can be further enhanced. Further, when the fundamental wave light source is implemented by a fiber laser light source having a polarized wave holding fiber, which is able to emit a fundamental wave light having polarized light components in two directions having a small difference in wavelengths, it is possible to facilitate control when the wavelength conversion mechanism wavelength-converts the respective polarized light components independently.

Furthermore, according to the image display optical device of the present invention, since the green lights of different wavelengths which are emitted from the green light source are emitted from plural positions and spatial modulation is performed to each of the lights of different wavelengths, resolution of the green color to which human eyes are highly sensitive is enhanced, resulting in a high image quality of the image display optical device.

Furthermore, when lights of different wavelengths and different polarization directions are emitted as the green lights from the green light source and spatial modulation is performed to each of the lights, different speckle noises are overlapped on the image projection plane, and therefore, unnecessary noise pattern (speckle noise) can be significantly reduced when the green light source is used as a light source for an image display device.

Figure 1A:
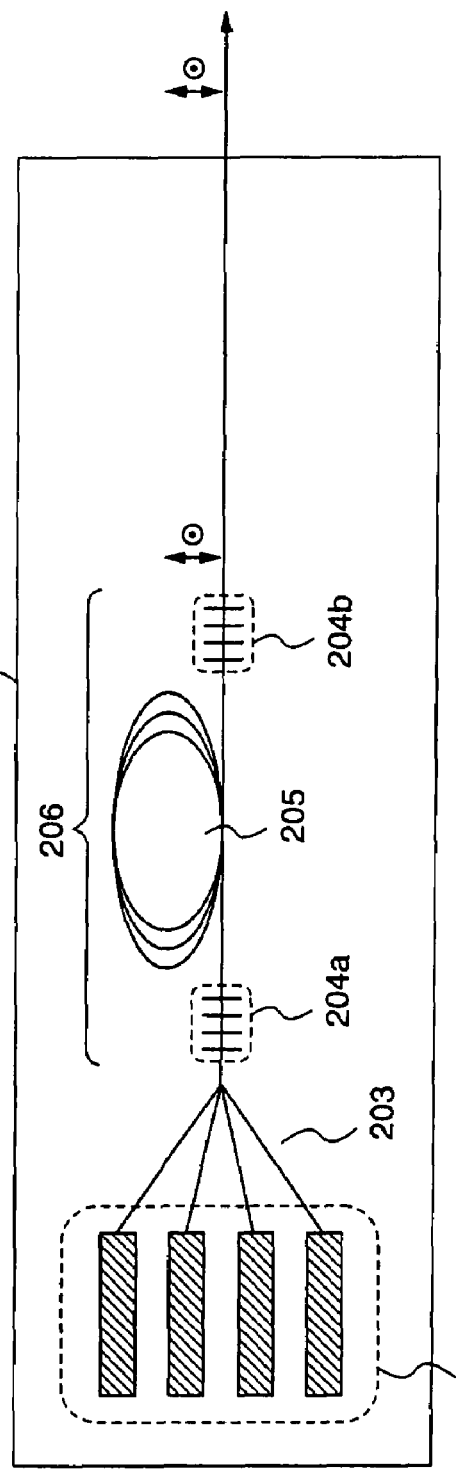
FIG. 1 is a schematic diagram illustrating the construction of a fiber laser light source which is used in a wavelength conversion optical device according to the first embodiment of the present invention.

DESCRIPTION OF REFERENCE NUMERALS 100,300,400,500,600,700,800 . . . wavelength conversion optical device
101,301 . . . fundamental wave light source
102a,102b . . . wavelength conversion part
103a,103b . . . separation mirror
104 . . . beam diameter conversion mechanism
201,201' . . . fiber laser light source
202 . . . pump combiner
204a,204b . . . fiber grating
205 . . . Yb-doped double clad polarized light holding fiber
207 . . . polarized light unification mechanism
302a,302b . . . condenser lens
303a . . . first wavelength conversion element
303b,503 . . . second wavelength conversion element
304a,304b . . . recollimator lens
305a,305b,605a,605c,705a,705b . . . . Peltier element
306 . . . polarization beam splitter
307 . . . fundamental wave ½ wavelength plate
308a,308b,308c . . . dichroic mirror
309 . . . emission prism
603,706 . . . wavelength conversion element
608,609 . . . prism for folding
608a,608b,609a,609b,708a,708b,709a,709b . . . reflection mirror
703 . . . polarization inversion unit
708,709 . . . prism part
807 . . . ½ wavelength plate for fundamental wave or second harmonic wave
900 . . . image display optical device
902,902' . . . green light source
903 . . . blue light source
904 . . . spatial modulation element for red
905a,905b . . . spatial modulation element for green
906 . . . spatial modulation element for blue
907 . . . mirror
908 . . . wave multiplexing prism
909 . . . projection lens
910 . . . screen

BEST MODE TO EXECUTE THE INVENTION

Hereinafter, embodiments of the present invention will be described with reference to the drawings.

Embodiment 1

In the first embodiment of the present invention, a fiber laser light source using a Yb-doped double-clad polarized-wave holding fiber is used as a fundamental wave light source, and quasi phase matching wavelength conversion elements which are obtained by forming periodic polarization inversions on lithium niobate crystal to which magnesium oxide is doped (Mg:LN) to prevent deterioration due to light are used as wavelength conversion elements, and the wavelength conversion elements are disposed in series, whereby a fundamental wave emitted from the fundamental wave light source is subjected to wavelength conversion.

Initially, the construction of the fundamental wave light source and the construction of the wavelength conversion optical device according to the first embodiment will be described with reference to FIGS. 1 and 2, respectively. In the wavelength conversion optical device 300 according to the first embodiment, the wavelength conversion elements are disposed in series. Thereby, the installation area can be reduced.

In the wavelength conversion optical device 300 according to the first embodiment, a fiber laser light source is used as a fundamental wave light source 301 as described above. A fundamental wave L11 emitted from the fiber laser light source has a horizontal polarization direction (p direction) and a vertical polarization direction (s direction) with respect to the wavelength conversion elements in the wavelength conversion optical device 300. In the wavelength conversion optical device 300 according to the first embodiment, independent wavelength conversions are performed in the respective polarization directions (p direction and s direction).

Hereinafter, the construction of the fiber laser light source used for the first embodiment will be described in detail. Initially, infrared lights emitted from an excitation semiconductor laser light source (wavelength: 915 nm) 202 are combined into a single fiber by a pump combiner 203. The total output of the excitation light at this time is 30 W. This excitation light is condensed onto a Yb-doped double-clad polarized-wave holding fiber 205 (hereinafter referred to simply as "Yb-doped polarized-wave holding fiber") which is a laser medium. Fiber gratings 204a and 204b which are designed so as to perform reflection with an oscillation wavelength (1084 nm) are connected to both ends of the Yb-doped polarized-wave holding fiber 205, and a resonator 206 is constituted by the Yb-doped polarized-wave holding fiber 205 and the fiber gratings 204a and 204b.

Figure 3:
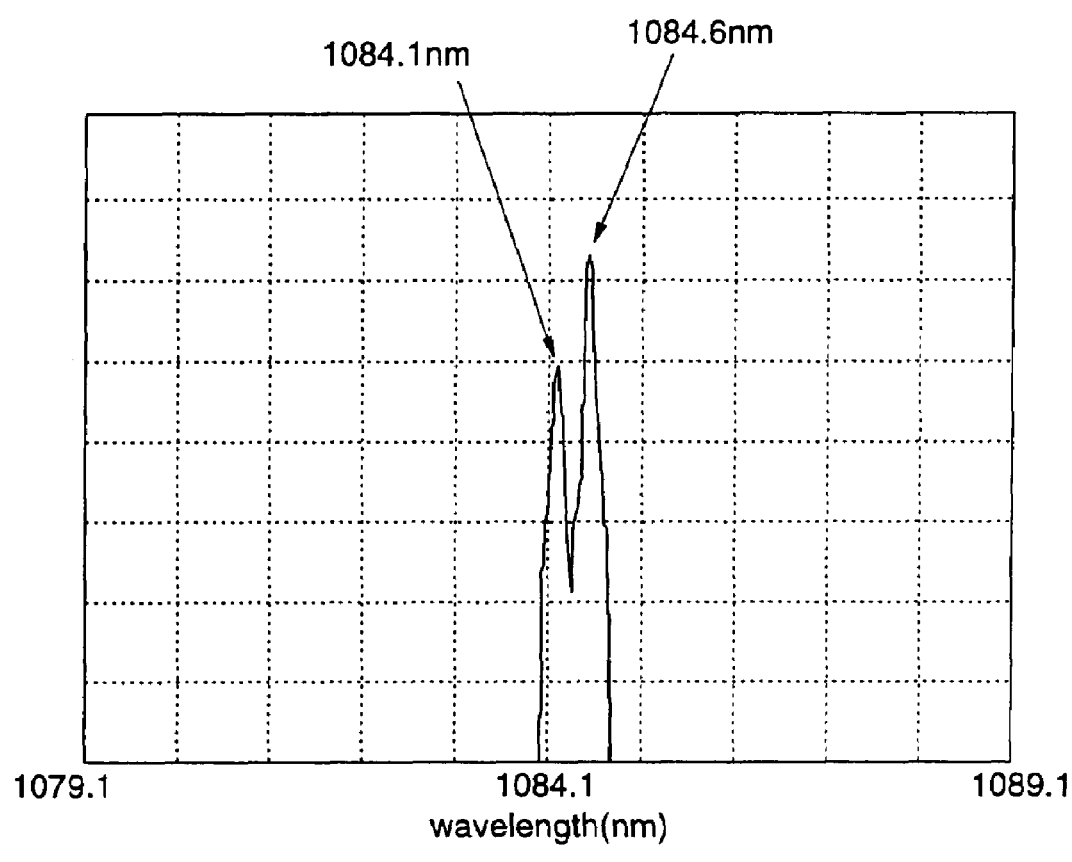
FIG. 3 is a diagram illustrating wavelength spectrums of a fundamental wave emitted from the fiber laser light source used in the wavelength conversion optical device according to the first embodiment.

Usually, the laser light source using the polarized-wave holding fiber has two polarized lights in the p direction and the direction which are perpendicular to each other (hereinafter referred to as a P polarized light and a S polarized light), respectively. Accordingly, when such fiber laser source is used in the conventional wavelength conversion optical device, in order to obtain a single polarized light, a polarized-wave unification mechanism 207 such as a polarizer must be provided in a stage subsequent to the laser resonator 206 to unify the two polarized lights as shown in FIG. 1(b). Further, the two polarized lights emitted from the fiber laser light source have a difference of ¹⁄₁₀ nm~several nm in their oscillation wavelengths as shown in FIG. 3 because the narrow-band fiber grating 204b formed on the polarized-wave holding fiber has two reflection peaks according to the polarization directions. Therefore, in the polarized-light unification mechanism 207, adjustment for uniformizing the oscillation wavelengths of the two polarized waves is also carried out.

In the wavelength conversion optical device 300 according to the first embodiment, however, the respective polarized lights (P polarized light and S polarized light) which have different wavelengths and are in the two directions perpendicular to each other are subjected to wavelength conversion independently. Accordingly, it is not necessary to provide the fiber laser light source 201 with the polarized-wave unification mechanism 207 for performing unification of the two polarized lights and control of the oscillation wavelengths, and consequently, the construction of the fundamental wave light source 301 is simplified.

If the polarized-wave holding fiber is not used as a fiber constituting the fiber laser light source, the light emitted from the fiber laser light source becomes randomly polarized lights (polarization independence) and thereby the oscillation wavelengths thereof are unified. Therefore, the fiber laser light source used in the present invention must be constituted by the polarized-wave holding fiber to oscillate plural wavelengths.

As described above, when the fiber laser light source 201 having the above-mentioned polarized-wave holding fiber is used as the fundamental wave light source 301, the fiber laser light source 201 can output a fundamental wave having polarized wave components in two directions having a small difference in oscillation wavelengths, and the fundamental wave light can be reliably wavelength-converted independently for the respective polarized-light components in the wavelength conversion elements to be described later.

Next, a description will be given of the construction of the wavelength conversion optical device 300 according to the first embodiment which uses the above-mentioned fiber laser light source 201 as the fundamental wave light source 301.

Initially, a light L11 (1084 nm: fundamental wave) emitted from the fundamental wave light source 301 is collimated so as to have a beam diameter of about 800 μm by a collimator lens or the like (not shown), and then condensed by a condenser lens 302a (focal distance=30 mm). Then, the condensed fundamental wave light L11 is incident on a first-stage wavelength conversion element 303a and subjected to wavelength conversion. In the first wavelength conversion element 303a, one of the two-direction polarized lights (P polarized light and S polarized light) of the fundamental wave L11, which is parallel to the direction of the dielectric main axis (z axis) of the crystal (P polarized light), is subjected to wavelength conversion. In the first wavelength conversion element 303a, polarization inversion structures are periodically formed (periodΛ=7.38 μm) on Mg:LN (the direction of the dielectric main axis (z axis) of the crystal is perpendicular to the inplane of the substrate) having a thickness of 1 mm and a length of 25 mm, and the both ends of the wavelength conversion element 303a are subjected to optical polishing, and further, the light incident side is subjected to a low-reflection coating for the fundamental wave (wavelength=1084 nm) while the light emission side is subjected to a low-reflection coating for the second harmonic wave (wavelength=about 542 nm). Further, the first wavelength conversion element 303a is fixed onto a copper plate, and its temperature is controlled (about 22° C.) by a Peltier element 305a. Fine adjustment of the phase matching wavelength is performed by the temperature control of the wavelength conversion element. In the first wavelength conversion element 303a, 20~30% of the incident light L11 is wavelength-converted in power conversion, resulting in a green light (542 nm) having a wavelength that is half the wavelength of the incident light.

Therefore, the first wavelength conversion element 303a outputs a light L12 including the green light that is wavelength-converted by the wavelength conversion element 303a, the residual fundamental wave light (residual fundamental wave light of the P polarized light), and the fundamental wave light of the other polarized light that has not been wavelength-converted by the first wavelength conversion element 303a, i.e., the polarized light perpendicular to the direction of the dielectric main axis (z axis) of the crystal (S polarized light).

The output light L12 is restored to a parallel light by a recollimator lens 304a, and thereafter, the optical paths of the green light and the residual fundamental wave light of the P polarized light are bent at 90° with a polarization beam splitter 306, thereby separating the light L12 into a light L13 including the green light and the residual fundamental wave light of the P polarized light, and a fundamental wave light L14 of the S polarized light that has not been wavelength-converted by the first wavelength conversion element 303a.

The fundamental wave light L14 of the S polarized light which has passed through the polarization beam splitter 306 passes through a λ/2 wavelength plate of the fundamental wave (hereinafter simply referred to as λ/2 wavelength plate) 307. Since the λ/2 wavelength plate 307 is arranged so that the polarization direction of the incident fundamental wave light L14 is matched to the direction of the dielectric main axis (z axis) of the second-stage wavelength conversion element 303b that is disposed in the subsequent stage, the fundamental wave light L14 of the S polarized light is changed to a fundamental wave light L15 of the P polarized light after passing through the λ/2 wavelength plate 307.

The fundamental wave light L15 of the P polarized light is condensed by a condenser lens 302b, and thereafter, it is incident on the second-stage wavelength conversion element 303b. In the second wavelength conversion element 303b, as in the first wavelength conversion element 303a, one of the two-direction polarized lights (P polarized light and S polarized light) of the fundamental wave, which is parallel to the direction of the dielectric main axis (z axis) of the crystal (P polarized light), is subjected to wavelength conversion. In the second wavelength conversion element 303b, polarization inversion structures are periodically formed (periodΛ=7.38 μm) on Mg:LN (the direction of the dielectric main axis (z axis) of the crystal is perpendicular to the inplane of the substrate) having a thickness of 1 mm and a length of 25 mm. The coating conditions, the holding manner, and the temperature control method with a Peltier element 305b are identical to those for the first wavelength conversion element 303a. However, as described above, since the P polarized light and the S polarized light emitted from the fiber laser light source have slightly different wavelengths (wavelength difference=0.5 nm in FIG. 3), the Peltier element 305b controls the temperature of the second wavelength conversion element 303b with a temperature (about 28° C.) different from that of the Peltier element 305a. Consequently, fine control of the phase matching wavelength can be carried out, and the phase matching wavelengths of the S polarized light and the P polarized light can be adjusted, respectively. Also in this second wavelength conversion element 303b, 20~30% of the incident light L15 is wavelength converted in power conversion, resulting in a green light (about 542 nm) having a wavelength that is half the wavelength of the incident light.

The second wavelength conversion element 303b emits a light L16 including the green light that is wavelength-converted by the wavelength conversion element 303b, and the residual fundamental wave light (residual fundamental wave light of the P polarized light). Thereafter, the output light L16 is restored to a parallel light by a recollimator lens 304b, and the green light L16a and the residual fundamental wave light 16b are separated by the dichroic mirror 308c.

On the other hand, the light L13 which has already been wavelength-converted by the first wavelength conversion element 303a, the optical path of which is bent at 90° by the polarization beam splitter 306, is separated into the green light L13a and the residual fundamental wave light 13b by the dichroic mirror 308a.

Then, the green lights L13a and L16a of the P polarized light which are wavelength-converted by the first and second wavelength conversion elements 303a and 303b, respectively, are emitted in the same emission direction by using dichroic mirrors 308a, 308b, 308c, a prism 309, and the like.

Figure 4:
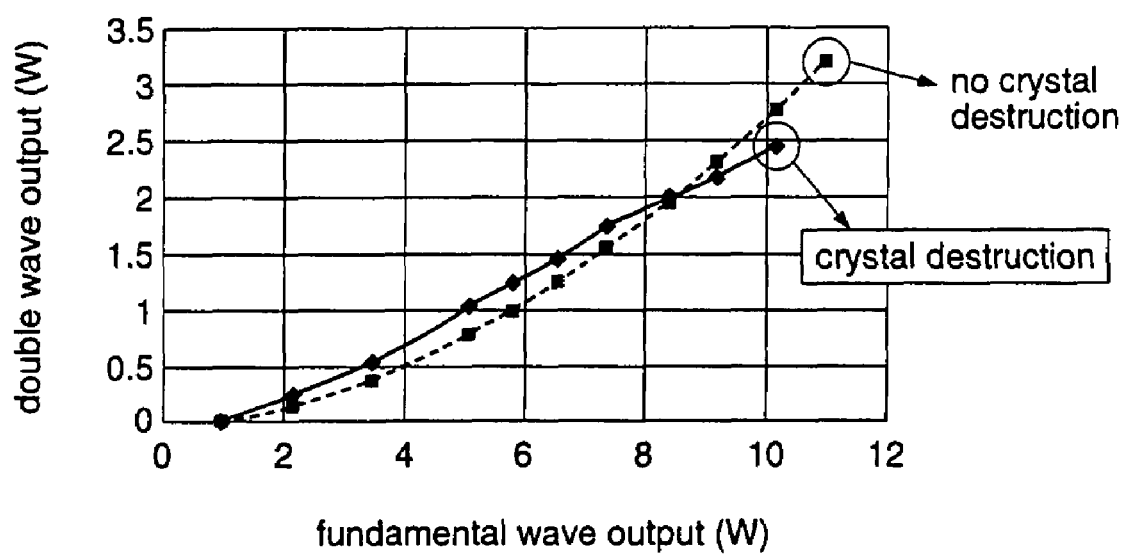
FIG. 4 is a diagram illustrating output characteristics of a wavelength conversion optical device having a single stage of wavelength conversion element, and output characteristics of the wavelength conversion optical device according to the first embodiment, which are compared with each other.

FIG. 4 is a diagram in which the second harmonic wave output characteristics in the wavelength conversion optical device 300 of the first embodiment (dotted line) and the second harmonic wave output characteristics in the conventional wavelength conversion optical device having a wavelength conversion element (solid line) are plotted.

As is evident from FIG. 4, even when the device receives a fundamental wave light for obtaining an output power exceeding 3 W (4 W and more), which light has conventionally caused crystal destruction, there occurs neither output saturation of green light due to ultraviolet light and nor crystal destruction. The reason is as follows. In the device 300, plural wavelength conversion elements are provided, and either the P polarized light or the S polarized light in the incident fundamental wave light is wavelength-converted in each of the wavelength conversion elements, and therefore, a light of such degree that the P polarized light and the S polarized light are not affected by occurrence of ultraviolet light can be input to each wavelength conversion element. Accordingly, in the construction of the first embodiment, a high-output fundamental wave light which cannot conventionally be input to the wavelength conversion element because it causes crystal destruction can be input to the wavelength conversion element of the present invention, thereby realizing high conversion efficiency without crystal destruction.

Figure 5:
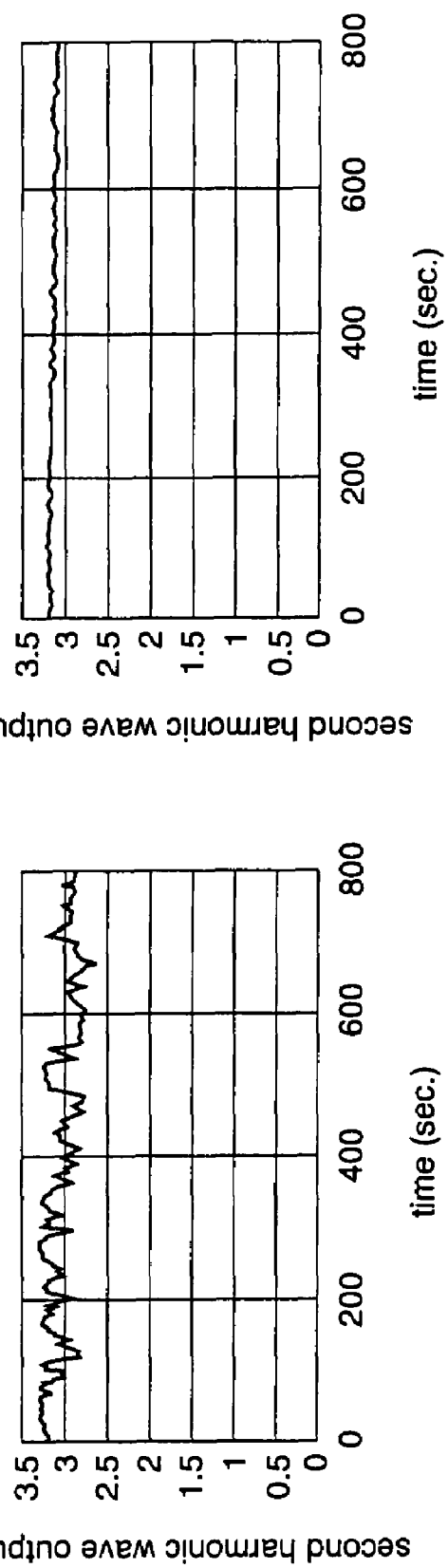
FIG. 5 is a plot diagram illustrating output characteristics of a conventional wavelength conversion optical device having two stages of wavelength conversion elements (FIG. 5(*a*)), and output characteristics of the wavelength conversion optical device according to the first embodiment (FIG. 5(*b*)).
Figure 14:
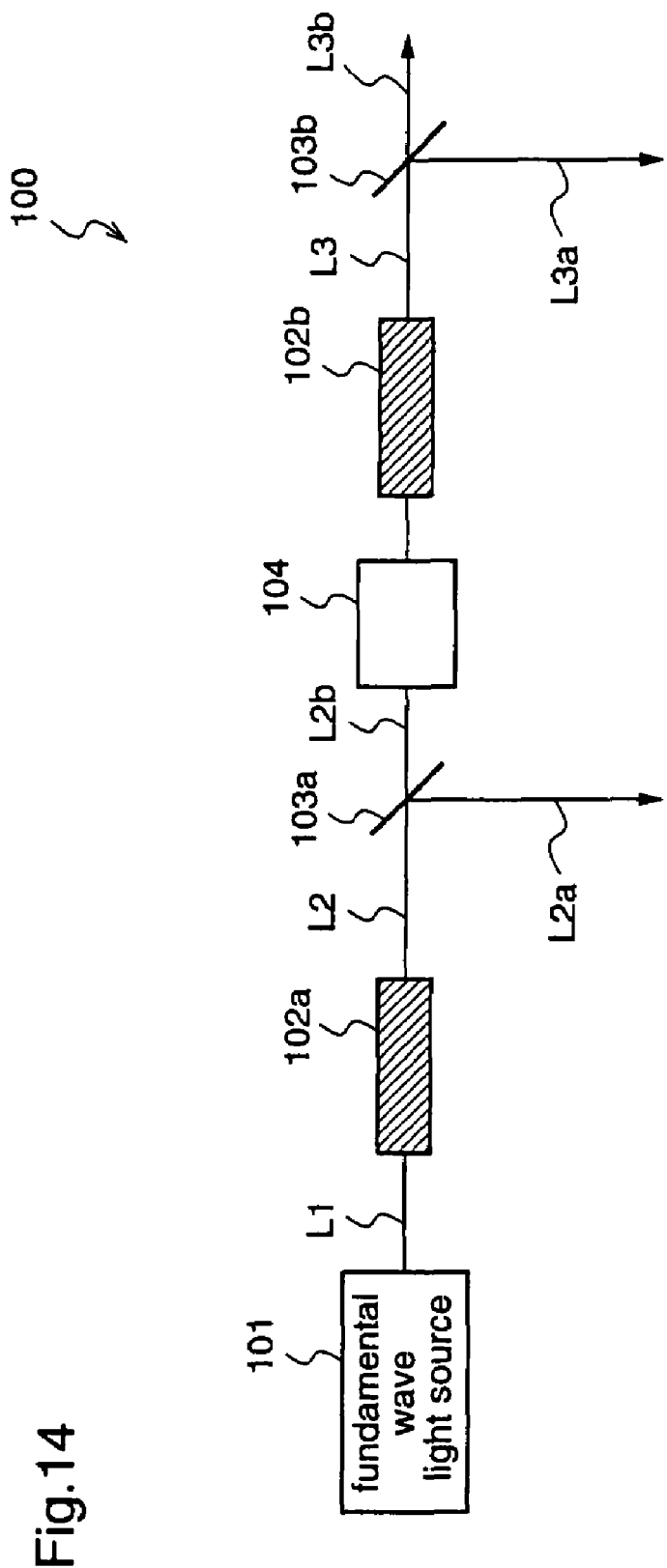
FIG. 14 is a diagram illustrating a conventional wavelength conversion optical device having two stages of wavelength conversion elements.

FIG. 5 is a diagram illustrating the output stability in the conventional wavelength conversion optical device shown in FIG. 14 (5(a)), and the output stability of the wavelength conversion optical device of the first embodiment (5(b)).

As is evident from FIG. 5, in the wavelength conversion optical device 300 of the first embodiment, the output stability is increased relative to that of the conventional wavelength conversion optical device 100. The reason is as follows. In the device 300, the residual fundamental wave light that has not been wavelength-converted by the preceding-stage wavelength conversion element is not wavelength-converted by the subsequent-stage wavelength conversion element, the wavelength conversion in the subsequent-stage wavelength conversion device is not affected by the wavelength conversion efficiency of the preceding-stage wavelength conversion element. Thereby, the device 300 can solve the problem that, when the output power of the first-stage wavelength conversion element is significantly deteriorated, the fundamental wave input to the second-stage wavelength conversion element dramatically increases to destruct the crystal, which is the problem of the conventional device 100.

Figure 6:
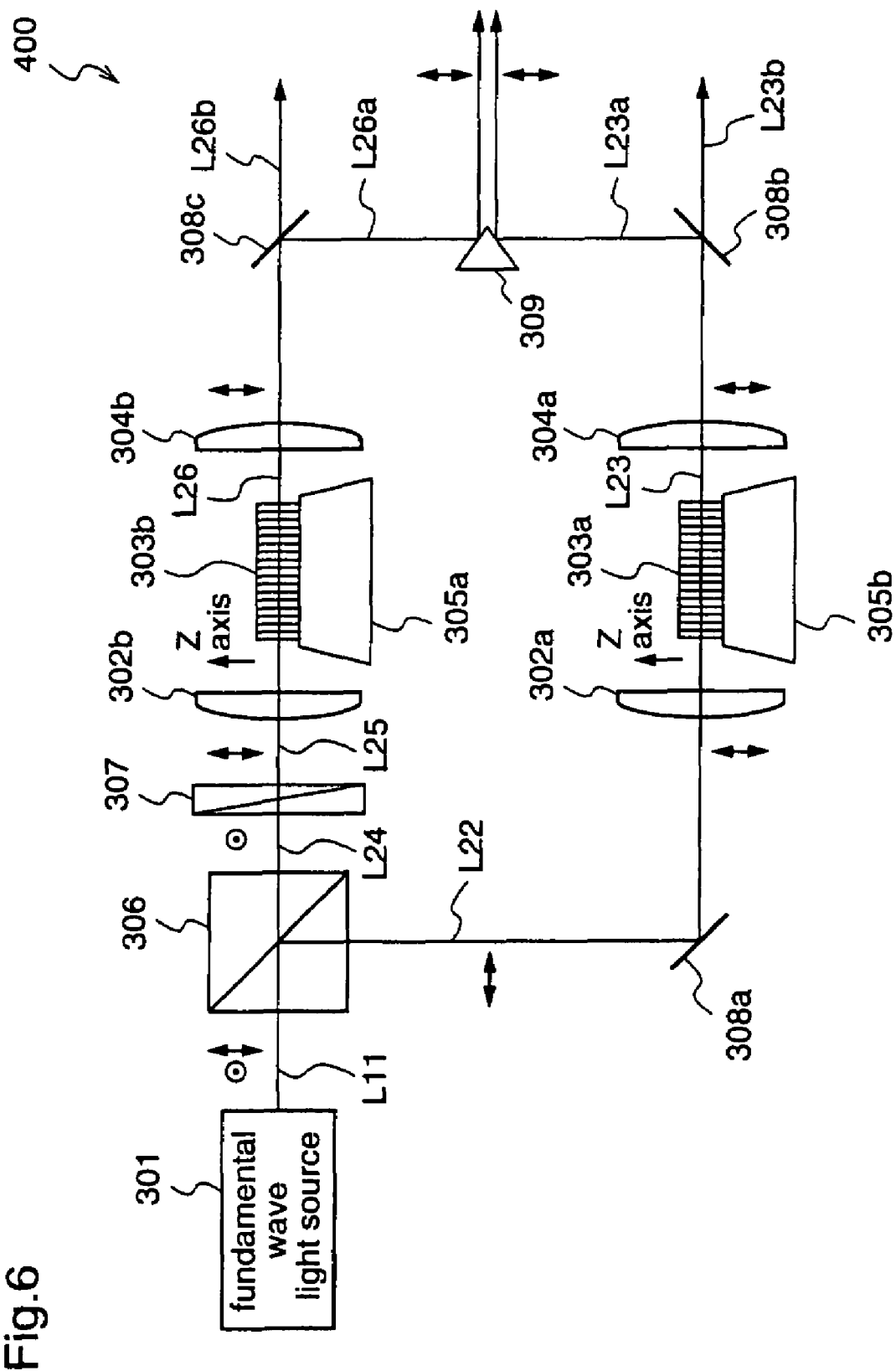
FIG. 6 is a diagram illustrating the construction of a wavelength conversion optical device in which wavelength conversion elements are disposed in parallel, according to the first embodiment of the present invention.

While in this first embodiment two wavelength conversion elements 303a and 303b are disposed in series to perform wavelength conversion, the two wavelength conversion elements may be disposed in parallel as shown in FIG. 6. Hereinafter, this construction will be described with reference to FIG. 6.

FIG. 6 is a diagram illustrating the construction of the wavelength conversion optical device in which two wavelength conversion elements are disposed in parallel. Also in this case, the above-mentioned fiber laser light source 201 is used as the fundamental wave light source 301. Therefore, the fundamental wave L11 has a light in a polarization direction horizontal to the wavelength conversion element (P polarized light) and a light in a polarization direction vertical to the wavelength conversion element (S polarized light), and further, the wavelengths of the respective polarized lights are slightly different from each other (refer to FIG. 3).

Initially, the light L11 (1084 nm: fundamental wave) emitted from the fundamental wave light source 301 is collimated to a beam diameter of about 800 μm by a collimator lens or the like (not shown), and thereafter, the optical path of the fundamental wave light L22 of the P polarized light is bent at 90° by the polarization beam splitter 306, thereby separating the light L11 into the fundamental wave light L22 of the P polarized light, and the fundamental wave light of the S polarized light.

By the way, when a wavelength conversion crystal having a polarization inversion structure is used as in this first embodiment, the beam quality (transverse mode) of the fundamental wave is deteriorated when passing through the first-stage wavelength conversion element 303a, and consequently, the conversion efficiency of the fundamental wave light in the second-stage wavelength conversion element 303b is reduced by 20%~30%.

In the construction shown in FIG. 6, however, the fundamental wave L11 is separated into polarized lights in two directions before it is input to the wavelength conversion element. Thereby, deterioration of the beam quality (transverse mode) caused by that the fundamental wave L11 passes through the wavelength conversion element can be easily suppressed, and therefore, reduction in the conversion efficiency due to deterioration of the beam quality (transverse mode distortion) can be suppressed even when plural wavelength conversion elements are provided.

The fundamental wave light L22 of the P polarized light, the optical path of which is bent at 90° by the polarization beam splitter 306, is input to the condenser lens 302a by the dichroic mirror 308a and then condensed (focal distance=30 mm). The condensed fundamental wave light L22 is input to the first wavelength conversion element 303a, and wavelength-converted. The size of the first wavelength conversion element 303a, the polarization inversion structure, and the facet processing are identical to those for the first wavelength conversion element 303a. Further, the method for holding the first wavelength conversion element 303a, the temperature control method by the Peltier element 305, and the fine adjustment method for the phase matching wavelength are also identical to those mentioned above. In the first wavelength conversion element 303a, 20~30% of the incident light L22 is wavelength-converted in power conversion, resulting in a green light (about 542 nm) having a wavelength that is half the wavelength of the incident light.

Accordingly, the first wavelength conversion element 303a outputs a light L23 including the green light that is wavelength-converted in the wavelength conversion element 303a, and the residual fundamental wave light (the residual fundamental wave light of the P polarized light).

On the other hand, the polarization direction of the fundamental wave light L24 of the S polarized light that has passed through the polarization beam splitter 306 is rotated at 90° by the ½ wavelength plate 307 that is disposed in front of the condenser lens 302b, resulting in the fundamental wave light L25 of the polarized light (P polarized light) that is parallel to the direction of the dielectric main axis (z axis) of the wavelength conversion element. Thereafter, the fundamental wave light L25 of the P polarized light is condensed by the condenser lens 302b (focal distance=30 mm) and then it is input to the second wavelength conversion element 303b and subjected to wavelength conversion. The size of the second wavelength conversion element 303a, the polarization inversion structure, and the facet processing are identical to those for the above-mentioned second wavelength conversion element 303b. Further, the method for holding the second wavelength conversion element 303b, the temperature control method by the Peltier element 305, and the fine adjustment method for the phase matching wavelength are also identical to those mentioned above. Also in the second wavelength conversion element 303b, 20~30% of the incident light L25 is wavelength-converted in power conversion, resulting in a green light (about 542 nm) having a wavelength that is half the wavelength of the incident light.

Accordingly, the second wavelength conversion element 303b outputs a light L26 including the green light that is wavelength-converted in the wavelength conversion element 303b, and the residual fundamental wave light (the residual fundamental wave light of the P polarized light).

The respective lights L23 and L26 emitted from the first and second wavelength conversion elements 303a and 303b are restored to parallel lights by recollimator lenses 304a and 304b, and then separated into green lights L23a and L26a and residual fundamental wave lights L23b and L26b by the dichroic mirrors 308b and 308c, respectively, and further, emitted in the same emission direction by using the dichroic mirrors 308b and 308c, a prism 309, and the like.

Figure 7:
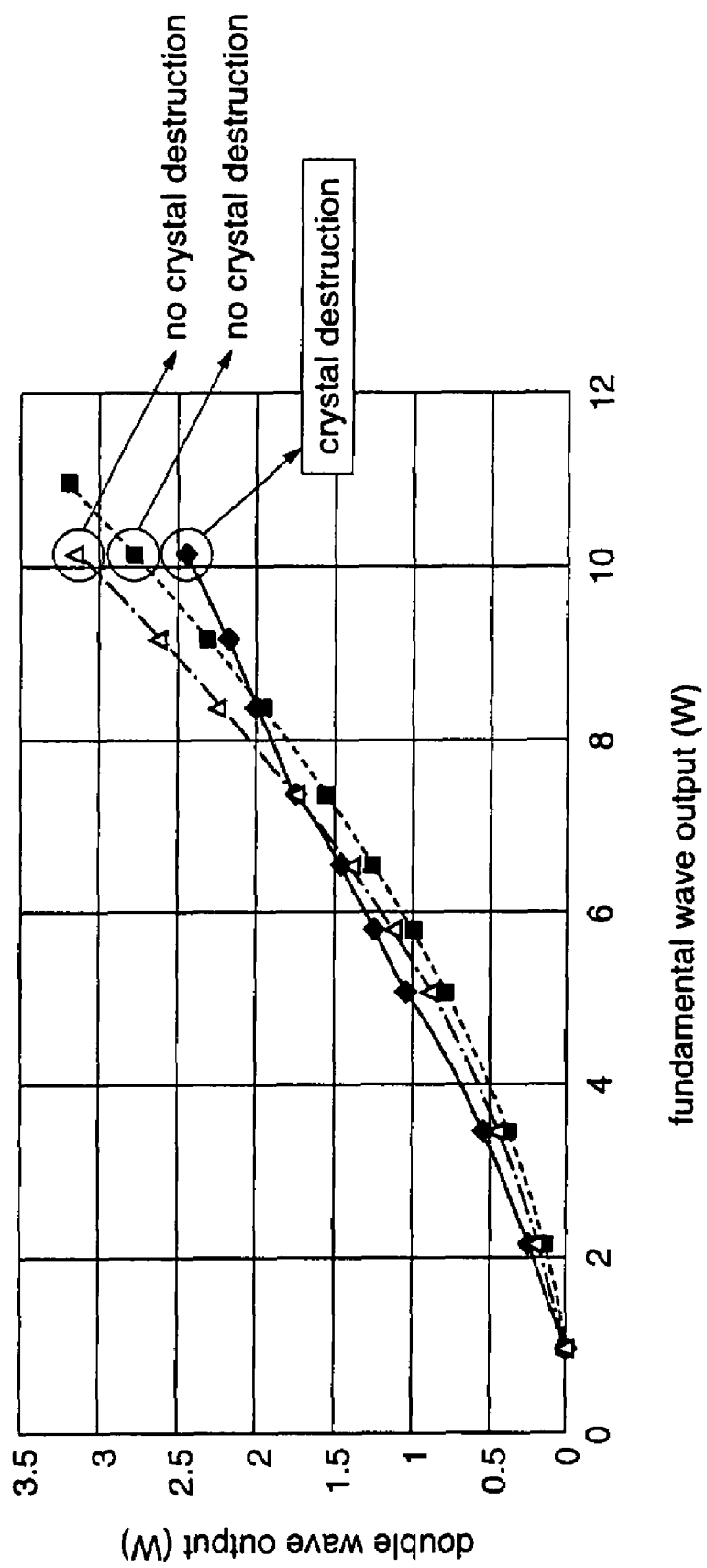
FIG. 7 is a diagram illustrating output characteristics of a wavelength conversion optical device having a single stage of wavelength conversion element, output characteristics of a wavelength conversion optical device according to the first embodiment in which wavelength conversion elements are disposed in series, and output characteristics of a wavelength conversion optical device according to the first embodiment in which wavelength conversion elements are disposed in parallel.

FIG. 7 is a diagram in which the second harmonic wave output characteristics in the wavelength conversion optical device 400 shown in FIG. 6 (dashed line), the second harmonic wave output characteristics in the wavelength conversion optical device having a wavelength conversion element (solid line), and the second harmonic wave output characteristics in the wavelength conversion optical device 300 according to the first embodiment (dotted line) are plotted.

As is evident from FIG. 7, in the case of the wavelength conversion optical device 400 shown in FIG. 6, even when the wavelength conversion device receives a fundamental wave light for obtaining an output power exceeding 3 W (4 W and more), which light conventionally causes crystal destruction, there occurs neither output saturation of green light due to ultraviolet light nor crystal destruction. Further, the output of the second harmonic wave from the wavelength conversion optical device 400 is larger than the output of the second harmonic wave from the wavelength conversion optical device 300 shown in FIG. 2. The reason is as follows. In the construction of the device 400 shown in FIG. 6, since the fundamental wave input L11 is separated into polarized lights in two directions before it is incident on the wavelength conversion element and the respective polarized lights are incident on the respective wavelength conversion elements, it is possible to suppress reduction in the conversion efficiency which is caused by that the beam quality is deteriorated (transverse mode distortion) due to transmission through the wavelength conversion element. Further, also in the construction shown in FIG. 6, as in the construction shown in FIG. 2, the output stability of the second harmonic wave is increased, and therefore, the device 400 is superior in the output stability to the conventional device 100. In addition, it is also possible to solve the problem that, when the output of the first-stage wavelength conversion element significantly deteriorates, the fundamental wave input to the second stage dramatically increases to destroy the crystal, which was the problem of the conventional device 100.

As described above, according to the wavelength conversion optical device of the first embodiment, the fiber laser light source which outputs the fundamental wave L11 having polarized lights in two directions (P polarized light and S polarized light) that are perpendicular to each other is used as the fundamental wave light source 301, and the P polarized light and the S polarized light of the fundamental wave L11 are individually wavelength-converted by the respective wavelength conversion elements 303a and 303b. Therefore, a high-output fundamental wave light, which cannot conventionally be input to the wavelength conversion element because crystal destruction occurs, can be input to the respective wavelength conversion elements 303a and 303b, and consequently, high conversion efficiency can be achieved without crystal destruction. Further, since the wavelength conversion in the subsequent-stage wavelength conversion element 303b is not affected by the wavelength conversion of the preceding-stage wavelength conversion element 303a, excellent output stability and reliability can be achieved.

Further, in this first embodiment, the fiber laser light source 201 having the polarized wave holding fiber is used as the fundamental wave light source 301, and the fundamental wave light L11 having the P polarized light and the S polarized light of different wavelengths are emitted. Therefore, each of the wavelength conversion elements 303a and 303b performs wavelength conversion for only a polarized light component of the fundamental wave light L11, which component is parallel to the direction of the dielectric main axis (z axis) of the crystal of each element and has a wavelength according to the control temperature by the Peltier element 305a or 305b included in each element, whereby the fundamental wave light L11 can be reliably wavelength-converted for each polarized light component. Accordingly, in the device 300, the output stability and reliability of the second harmonic wave can be more improved in the case where a fundamental wave light having a P polarized light and an S polarized light having different wavelengths is emitted as the fundamental wave light L11 and the light is wavelength-converted for each polarized light component in each wavelength conversion element, relative to the case where a randomly polarized light having a single oscillation wavelength is emitted as the fundamental wave light L11 and the light is wavelength-converted for each polarized light component in each wavelength conversion element.

Furthermore, as shown in FIG. 6, the wavelength conversion optical device may be constituted such that the fundamental wave light L11 is separated into the fundamental wave light L22 of the P polarized light and the fundamental wave light L24 of the S polarized light by the polarization beam splitter 306 before it is incident on the wavelength conversion elements 303a and 303b and then the separated lights L22 and L24 are incident on the wavelength conversion elements, whereby reduction in conversion efficiency due to deterioration in beam quality (transverse mode distortion) can be suppressed even when plural wavelength conversion elements are provided, resulting in higher conversion efficiency.

While in the above description the first-stage and second-stage wavelength conversion elements 303a and 303b have the same element length, these wavelength conversion elements 303a and 303b may have different element lengths. To be specific, when the fundamental wave light emitted from the fundamental wave light source is a randomly polarized light, its oscillation wavelength is a single wavelength, and its power distribution becomes equal for the P polarized light and the S polarized light, and therefore, the element lengths of the respective wavelength conversion elements corresponding to the P polarized light and the S polarized light are desired to be equal. However, when the P polarized light and the S polarized light respectively oscillate and the oscillation wavelength varies for each polarized light component like the fundamental wave light emitted from the fiber laser light source 201 that is the fundamental wave light source 301 of the first embodiment, since the power distribution differs according to the polarized light component (specifically, the power of the P polarized light: the power of the S polarized light=about 10:7~10:9), the situation would differ.

When the power of the S polarized light of the fundamental wave light is smaller than the power of the P polarized light, the element length of the wavelength conversion element for converting the S polarized light is increased by a degree corresponding to the difference in the powers between the polarized lights, whereby the output of the second harmonic wave after wavelength conversion can be approached to a ratio close to 1:1.

For example, in the case of the construction of the wavelength conversion optical device 300 according to the first embodiment, the element length of the first wavelength conversion element 303a corresponding to the P polarized light is 20 mm while the element length of the second wavelength conversion element 303b corresponding to the S polarized light is 25 mm, whereby an output ratio of about 1:1 can be achieved.

Embodiment 2

While in the first embodiment the two second harmonic waves that are wavelength-converted by the wavelength conversion optical device are in the same polarization direction, the polarization directions of the second harmonic waves are perpendicular to each other in this second embodiment.

Hereinafter, the construction of a wavelength conversion optical device 500 according to the second embodiment will be described with reference to FIG. 8.

Figure 1B:
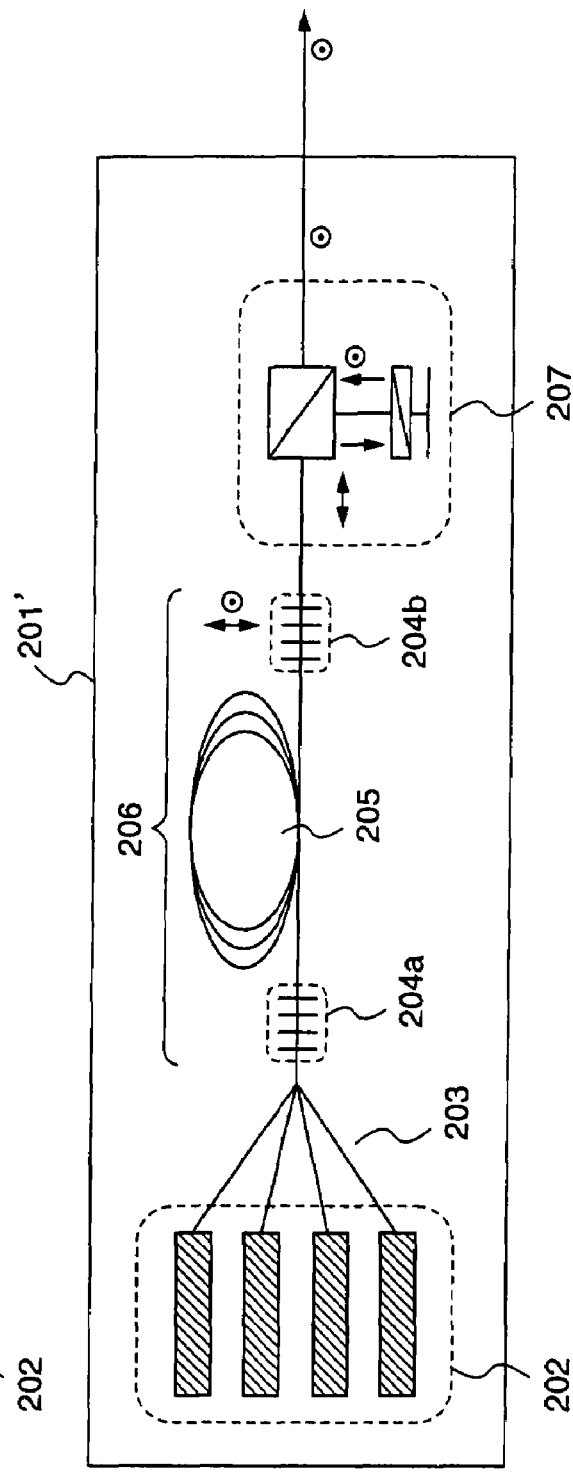

In this second embodiment, as in the first embodiment, the fiber laser light source 201 using the Yb-doped polarized wave holding fiber 205 shown in FIG. 1(a) is adopted, quasi phase matching wavelength conversion elements which are obtained by forming periodic polarization inversions on lithium niobate crystal to which magnesium oxide is doped (Mg:LN) to prevent deterioration due to light are adopted as wavelength conversion elements, and the wavelength conversion elements are disposed in serial to perform wavelength conversion. When the wavelength conversion elements are disposed in series, the installation area can be reduced.

Figure 2:
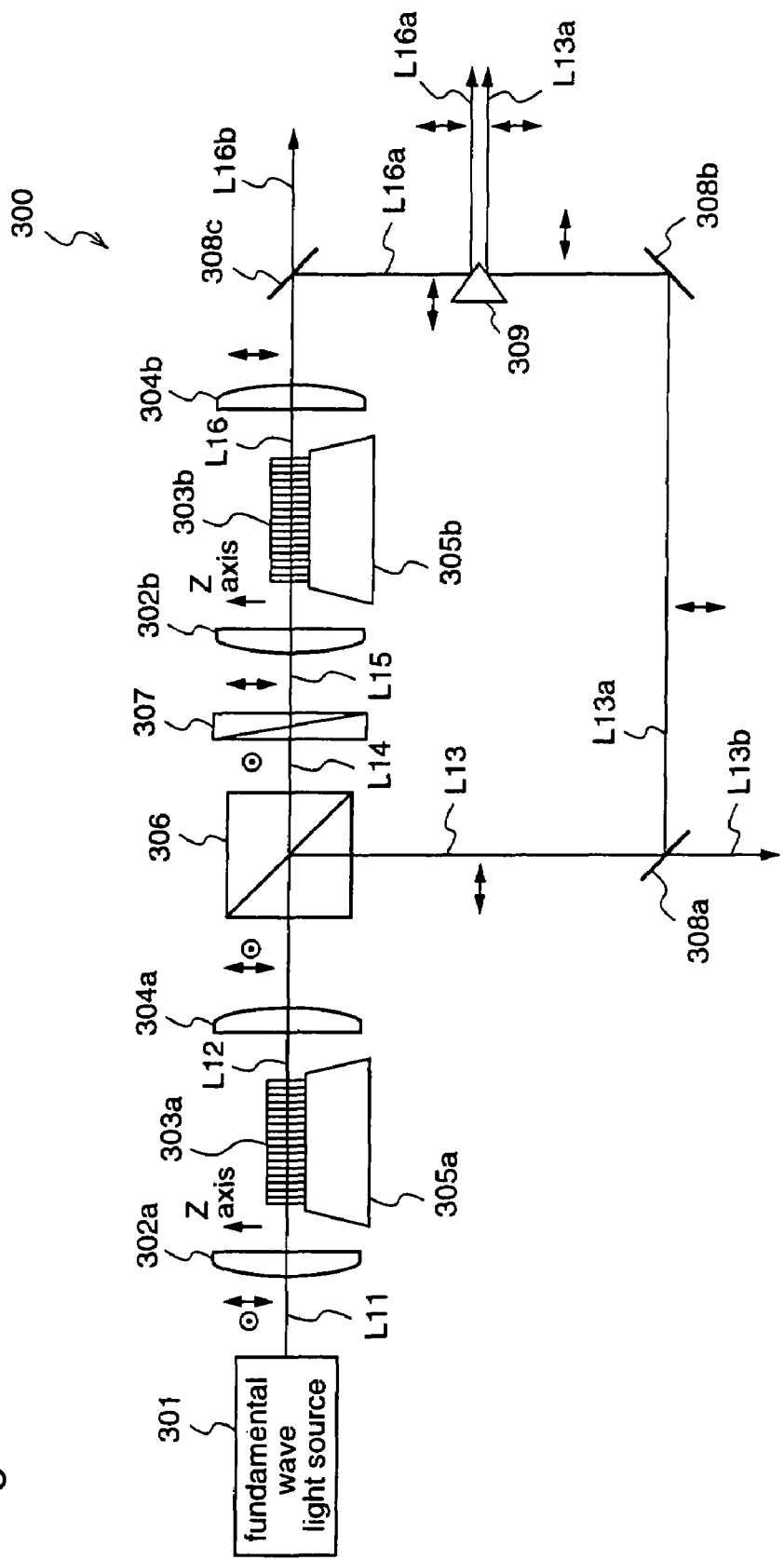
FIG. 2 is a diagram illustrating the construction of the wavelength conversion optical device according to the first embodiment of the present invention.

The construction of the wavelength conversion optical device 500 according to the second embodiment is approximately identical to the construction of the first embodiment shown in FIG. 2 except that the $\lambda/2$ wavelength plate 307 for rotating the fundamental wave light at 90° is not placed behind the polarization beam splitter 306, and the second-stage wavelength conversion element 503 is disposed rotated at 90° so that the direction of the dielectric main axis (z axis) of the crystal of the wavelength conversion element 503 is perpendicular to the direction of the dielectric main axis (z axis) of the crystal of the first-stage wavelength conversion element 303a to enable wavelength conversion of the fundamental wave light of the S polarized light. Hereinafter, the details will be described.

Initially, a light beam 111 (1084 nm: fundamental wave) emitted from the fundamental wave light source 301 is collimated to a beam diameter of about 800 μm by a collimator lens or the like (not shown), and condensed by the condenser lens 302a (focal distance=30 mm). Then, the condensed fundamental wave light L11 is incident on the first-stage wavelength conversion element 303a and subjected to wavelength conversion. In this first wavelength conversion element 303a, one of the polarized lights in two directions (P polarized light and S polarized light) of the fundamental wave L11, which is parallel to the direction of the dielectric main axis (z axis) of the crystal (P polarized light), is subjected to wavelength conversion. In the first wavelength conversion element 303a, polarization inversion structures are periodically formed with a period $\Lambda=7.38$ μm on Mg:LN having a thickness of 1 mm and a length of 25 mm (the direction of the dielectric main axis (z axis) of the crystal is perpendicular to the inplane of the substrate), and the both ends of the wavelength conversion element 303a are subjected to optical polishing, and further, the light incident end is subjected to a low reflection coating for the fundamental wave (wavelength=1084 nm) while the emission end is subjected to a low reflection coating for the second harmonic wave (wavelength=about 542 nm). Further, the first wavelength conversion element 303a is fixed onto a copper plate, and its temperature is controlled (about 22° C.) by the Peltier element 305a. Fine adjustment of the phase matching wavelength is performed by the temperature control of the wavelength conversion element. In the first wavelength conversion element 303a, the fundamental wave light of the P polarized light (20~30% of the incident fundamental wave light L11 in power conversion) is wavelength-converted, resulting in a green light (542 nm) having a wavelength that is half the wavelength of the incident light.

Therefore, the first wavelength conversion element 303a outputs a light L32 including the green light that is wavelength-converted by the wavelength conversion element 303a, the residual fundamental wave light (residual fundamental wave light of the P polarized light), and the fundamental wave light of the other polarized light that has not been wavelength-converted by the first wavelength conversion element 303a, i.e., the polarized light (S polarized light) that is perpendicular to the direction of the dielectric main axis (z axis) of the crystal.

The output light L32 is restored to a parallel light by the recollimator lens 304a. Thereafter, the optical paths of the green light and the residual fundamental wave light of the P polarized light are bent at 90° with the polarization beam splitter 306, thereby separating the light L32 into a light L33 including the green light and the residual fundamental wave light of the P polarized light, and a fundamental wave light L34 of the S polarized light that has not been wavelength-converted by the first wavelength conversion element 303a.

The fundamental wave light L34 of the S polarized light that has just passed through the polarization beam splitter 306 is condensed by the condenser lens 302b and is incident on the second-stage wavelength conversion element 503. Since this first wavelength conversion element 303a is disposed rotated at 90° so that the polarization direction of the incident light L34 (S polarized light) becomes parallel to the direction of the dielectric main axis (z axis) of the crystal, the polarized light (S polarized light) that is perpendicular to the direction of the dielectric main axis (z axis) of the crystal is wavelength-converted. In the second wavelength conversion element 503, polarization inversion structures are periodically formed with a period $\Lambda=7.38$ μm on Mg:LN having a thickness of 1 mm and a length of 25 mm (the direction of the dielectric main axis (z axis) of the crystal is perpendicular to the inplane of the substrate). Further, the coating condition, the holding method, and the temperature control method using the Peltier element 305b are identical to those for the first wavelength conversion element 303a. However, as described above, the P polarized light and the S polarized light emitted from the fiber laser light source have slightly different wavelengths (in FIG. 3, the wavelength difference is 0.5 nm). Accordingly, the Peltier element 305b controls the temperature of the second wavelength conversion element 303b at a temperature (about 28° C.) different from that of the Peltier element 305a. As a result, fine adjustment of the phase matching wavelength is carried out, and thereby the phase matching wavelengths of the S polarized light and the P polarized light can be matched, respectively. In this second wavelength conversion element 503, the fundamental wave light of the S polarized light (20~30% of the incident light L34 in power conversion) is wavelength-converted, resulting in a green light (about 542 nm) having a wavelength that is half the wavelength of the incident light.

The second wavelength conversion element 503 outputs a light L35 including the green light that is wavelength-converted by the wavelength conversion element 503, and the residual fundamental wave light (residual fundamental wave light of the S polarized light). Thereafter, the output light L35 is restored to a parallel light by the recollimator lens 304*b*, and separated into the green light L35*a* and the residual fundamental wave light L35*b* by the dichroic mirror 308*c*.

On the other hand, the light L33 including the green light and the residual fundamental wave light of the P polarized light, the optical paths of which are bent at 90° by the polarization beam splitter 306, is separated into the green light L33*a* and the residual fundamental wave light L33*b* by the dichroic mirror 308*a*.

The green light L33*a* of the P polarized light and the green light L35*a* of the S polarized light which are wavelength-converted by the first and second wavelength conversion elements 303*a* and 503, respectively, are emitted in the same direction by using the dichroic mirrors 308*a*, 308*b*, 308*c*, and the prism 309.

The output characteristics of the wavelength conversion optical device 500 according to the second embodiment are approximately equal to the output characteristics (refer to FIGS. 4 and 5) of the wavelength conversion optical device 300 of the first embodiment shown in FIG. 2. That is, in the construction of the second embodiment, a fundamental wave light having a high output power which cannot conventionally be incident on the wavelength conversion element because it causes crystal destruction, can be incident on the wavelength conversion element. As a result, even when the wavelength conversion element receives a fundamental wave light for obtaining an output power exceeding 3 W (4 W or more) which conventionally causes crystal destruction, it is possible to avoid output saturation of the green light due to the ultraviolet light and crystal destruction, thereby realizing high conversion efficiency without crystal destruction. Further, in the device 500, since the wavelength conversion by the latter-stage wavelength conversion element 503 is not affected by the wavelength conversion by the former-stage wavelength conversion element 303*a*, excellent output stability and reliability can be achieved. Furthermore, it is possible to resolve the problem that, when the output of the first-stage wavelength conversion element significantly decreases, the fundamental wave input to the second-stage wavelength conversion element dramatically increases to destroy the crystal, which is the program of the conventional device 100.

As described above, the wavelength conversion optical device 500 according to the second embodiment uses, as the fundamental wave light source 301, the fiber laser light source which outputs the fundamental wave L11 having polarized lights in two directions (P polarized light and S polarized light) that are perpendicular to each other, and the respective wavelength conversion elements 303*a* and 503 perform wavelength conversion for the P polarized light and the S polarized light of the fundamental wave L11, respectively. Therefore, a high-power fundamental wave light which cannot conventionally be incident on the wavelength conversion element because crystal destruction occurs, can be incident on the wavelength conversion elements 303*a* and 503, and consequently, high conversion efficiency can be achieved without crystal destruction. Further, since the wavelength conversion in the subsequent-stage wavelength conversion element 503 is not affected by the preceding-stage wavelength conversion element 303*a*, excellent output stability and reliability can be achieved.

Further, in this second embodiment, as in the first embodiment, the fiber laser light source 201 having the polarized wave holding fiber is adopted as the fundamental wave light source 301, and the fiber laser light source 201 emits the fundamental wave light L11 having the P polarized light and the S polarized light of different wavelengths. Therefore, each of the wavelength conversion elements 303*a* and 503 performs wavelength conversion for only a polarized light component of the fundamental wave light L11, which component is parallel to the direction of the dielectric main axis (z axis) of the crystal of each element and has a wavelength according to the control temperature by the Peltier element 305*a* or 305*b* included in each element, whereby the fundamental wave light L11 can be reliably wavelength-converted for each polarized light component. Accordingly, in the aforementioned device, the output stability and reliability of the second harmonic wave can be more improved in the case where a fundamental wave light having a P polarized light and an S polarized light having different wavelengths is emitted as the fundamental wave light L11 and the light is wavelength-converted for each polarized light component in each wavelength conversion element, relative to the case where a randomly polarized light having a single oscillation wavelength is emitted as the fundamental wave light L11 and the light is wavelength-converted for each polarized light component in each wavelength conversion element.

While in this second embodiment the wavelength conversion elements are arranged in series, the wavelength conversion elements may be arranged in parallel as shown in FIG. 6 of the first embodiment, and the fundamental wave L11 may be separated into the respective polarized lights by the polarization beam splitter or the like in the stage prior to the wavelength conversion elements so that only one of the P polarized light and the S polarized light is incident on each wavelength conversion element. In this construction, reduction in conversion efficiency due to deterioration in beam quality can be suppressed, resulting in higher conversion efficiency.

Further, while in this second-embodiment the element lengths of the first-stage and second-stage wavelength conversion elements 303*a* and 305 are equal to each other, the element lengths of the wavelength conversion elements 303*a* and 503 may be different from each other, as in the first embodiment. For example, in the construction of the wavelength conversion optical device 500 according to the second embodiment, the element length of the first wavelength conversion element 303*a* for the P polarized light is 20 mm while the element length of the second wavelength conversion element 503 for the S polarized light is 25 mm, whereby an output ratio of about 1:1 can be obtained.

Furthermore, while in this second embodiment wavelength conversion elements using a substrate (z plate) in which the z axis direction of the dielectric main axis of the crystal is perpendicular to the inplane are adopted as the first and second wavelength conversion elements 303*a* and 503, a wavelength conversion element using a substrate (x plate) in which the x axis direction of the dielectric main axis is perpendicular to the inplane may be adopted as the wavelength conversion element for the fundamental wave light of the S polarized light (the second wavelength conversion element 503). In this case, it is not necessary to arrange the second wavelength conversion element with its crystal orientation being rotated at 90°. Also in this case, the polarization direction of the fundamental wave must be parallel to the z axis direction of the wavelength conversion element, as in the case of using the z plate.

Embodiment 3

While in the first embodiment the construction having two wavelength conversion elements has been described, in this third embodiment an incident light from the fundamental wave light source is folded by using a prism or a mirror so that the fundamental wave light can be independently wavelength-converted in the respective polarization directions (p direction and s direction) by using a wavelength conversion element. Thereby, the wavelength conversion optical device can be further reduced in size.

Hereinafter, the construction of the wavelength conversion optical device 600 according to the third embodiment will be described with reference to FIG. 9.

In this third embodiment, as in the first embodiment, a fiber laser light source 201 using a Yb-doped polarized wave holding fiber 205 as shown in FIG. 1(a) is adopted as the fundamental wave light source 301, and a quasi phase matching wavelength conversion element which is obtained by forming periodic polarization inversions on lithium niobate crystal to which magnesium oxide is doped (Mg:LN) to prevent deterioration due to light is used as the wavelength conversion element. Accordingly, as in the first embodiment, a fundamental wave light L11 emitted from the fundamental wave light source 301 has a light in a horizontal polarization direction (P polarized light) and a light in a vertical polarization direction (S polarized light) with respect to the wavelength conversion element, and further, the oscillation wavelengths of the respective polarized lights are slightly different from each other (refer to FIG. 3).

Initially, the light L11 (1084 nm: fundamental wave) emitted from the fundamental wave light source 301 passes through a prism for folding 608, and then it is condensed into the wavelength conversion element 603 by the condenser lens 302a. In the wavelength conversion element 603, one of the two polarized lights (P polarized light and S polarized light) of the fundamental wave L11, which is parallel to the direction of the dielectric main axis (z axis) of the crystal (P polarized light), is subjected to wavelength conversion.

The prism 608 has reflection planes 608a and 608b which are coated with dielectric multilayer films that transmit the fundamental wavelength and reflect the second harmonic wavelength (green light). In the wavelength conversion element 603, polarization inversion structures are periodically formed with a period Λ=7.38 μm on Mg:LN having a thickness of 1 mm and a length of 25 mm (the z axis direction thereof is perpendicular to the inplane of the substrate), and the both ends of the wavelength conversion element 603 are subjected to optical polishing, and further, the light incident end and emission end thereof are both subjected to low reflection coatings for the fundamental wave (wavelength=1084 nm) and the second harmonic wave (wavelength=about 542 nm), respectively. Further, the wavelength conversion element 603 is fixed onto a copper plate, and its temperature is controlled by Peltier elements 605a and 605b which are placed with the wavelength conversion element 603 between them. Fine adjustment of the phase matching wavelength is performed by the temperature control of the wavelength conversion element. Particularly in this third embodiment, the wavelength conversion element 603 is sandwiched between the two Peltier elements 605a and 605b as described above to divide the temperature control area in the wavelength conversion element 603 into upper and lower areas, whereby the phase match wavelengths of the P polarized light and the S polarized light can be matched, respectively. In this third embodiment, the upper portion of the wavelength conversion element 603 is controlled to about 22° C. by the Peltier element 605a, and the lower portion of the wavelength conversion element 603 is controlled to about 28° C. by the Peltier element 605b.

Accordingly, when the fundamental wave L11 transmits through the reflection plane 608a and is incident on the wavelength conversion element 603, the fundamental wave of the P polarized light (20~30% of the incident fundamental wave light in power conversion) is wavelength-converted by the wavelength conversion element 603, resulting in a green light (542 nm) having a wavelength that is half the wavelength of the incident light.

Therefore, at this time, the wavelength conversion element 603 outputs a light L42 including the green light that is wavelength-converted by the wavelength conversion element 603, the residual fundamental wave light (residual fundamental wave light of the P polarized light), and the fundamental wave light of the other polarized light (S polarized light) that has not been wavelength-converted by the wavelength conversion element 603.

The output light L42 is restored to a collimate light by the recollimator lens 304a, and the collimate light passes through the λ/2 wavelength plate 307. Since the λ/2 wavelength plate 307 is disposed such that the polarization direction of the fundamental wave light of the incident S polarized light is matched to the direction of the dielectric main axis (z axis) of the wavelength conversion element 603, the λ/2 wavelength plate 307 rotates the polarization direction of the fundamental wave light included in the output light L42. To be specific, the residual fundamental wave light of the P polarized light is changed to the residual fundamental wave light of the S polarized light, and the fundamental wave light of the S polarized light is changed to the fundamental wave light of the P polarized light.

The light L43 that has passed through the λ/2 wavelength plate 307 is incident on the prism for folding 609. The prism 609 has reflection planes 609a and 609b which are coated with dielectric multilayer films that reflect the fundamental wavelength and transmit the second harmonic wavelength (green light).

Accordingly, when the light L43 is incident on the prism 609, only the green light L43a of the converted P polarized light is transmitted and outputted through the reflection plate 609a, while the light L43b including the residual fundamental wave light of the S polarized light and the fundamental wave light of the P polarized light that has not been wavelength-converted by the wavelength conversion element 603 is reflected at the reflection planes 609a and 609b of the prism 609 to be folded back toward the wavelength conversion element 603.

Thereafter, the output light L43b is again condensed onto the wavelength conversion element 603 by the condenser lens 302b. As described above, since the fundamental wave light of the P polarized light is wavelength-converted in the wavelength conversion element 603, the fundamental wave light of the P polarized light in the light L43b (20~30% of the incident light L43b in power conversion) is wavelength converted, resulting in a green light (542 nm) having a wavelength that is half the wavelength of the incident light.

Accordingly, at this time, the wavelength conversion element 603 outputs a light L44 including the green light that is wavelength converted by the wavelength conversion element 603, the residual fundamental wave light (the residual fundamental wave light of the P polarized light), and the residual fundamental wave light of the S polarized light.

The output light L44 is incident on the prism 608, and only the fundamental wave light, i.e., only the light L44b including the residual fundamental wave light of the S polarized light and the fundamental wave light of the P polarized light, is transmitted and outputted at the reflection plane 608b of the prism 608, while the green light L44a of the P polarized light is reflected at the reflection planes 608a and 608b of the prism 608 to be folded back toward the wavelength conversion element 603.

The green light L44a of the P polarized light again passes through the wavelength conversion element 603, the recollimator lens 304a, and the λ/2 wavelength plate 307, and thereafter, it is incident on the prism 609, and transmitted and outputted through/from the reflection plane 609a.

As described above, according to the third embodiment, the green lights of the same polarization direction are emitted from the wavelength conversion optical device 600.

The output characteristics of the wavelength conversion optical device 600 are approximately equal to the output characteristics (refer to FIGS. 4 and 5) of the wavelength conversion optical device 300 of the first embodiment shown in FIG. 2. That is, in the construction of this third embodiment, a fundamental wave light having a high output power, which cannot conventionally be incident on the wavelength conversion element because crystal destruction occurs, can be incident on the wavelength conversion element. Therefore, even when the wavelength conversion element receives a fundamental wave light for obtaining an output power exceeding 3 W (4 W or more) which conventionally causes crystal destruction, it is possible to avoid output saturation of the green light due to the ultraviolet light and crystal destruction, thereby achieving high conversion efficiency without crystal destruction. Further, in the aforementioned device 600, since the second-time wavelength conversion performed by the wavelength conversion element 603 is not affected by the first-time wavelength conversion, excellent output stability and reliability can be achieved.

Furthermore, in this third embodiment, the fiber laser light source 201 having the polarized wave holding fiber is adopted as the fundamental wave light source 301, and the fiber laser light source 201 emits the fundamental wave light L11 having the P polarized light and the S polarized light of different wavelengths. Therefore, the wavelength conversion element 603 performs wavelength conversion for only a polarized light component in the fundamental wave light L11, which component is parallel to the direction of the dielectric main axis (z axis) of the crystal of the element and has a wavelength corresponding to the temperature controlled by the Peltier elements 605a and 605b provided above and beneath the element, whereby the fundamental wave light L11 can be reliably wavelength-converted for each polarized light component by using the wavelength conversion element 603. Accordingly, in the aforementioned device 600, the output stability and reliability of the second harmonic wave can be more improved in the case where a fundamental wave light having a P polarized light and an S polarized light of different wavelengths is emitted as the fundamental wave light L11 and the light is wavelength-converted for each polarized light component by each wavelength conversion element, relative to the case where a randomly polarized light having a single oscillation wavelength is emitted as the fundamental wave light L11 and the light is wavelength-converted for each polarized light component in each wavelength conversion element. Further, in this third embodiment, since the Peltier elements 605a and 605b are provided above and beneath the wavelength conversion element 603 and the respective Peltier elements perform temperature control with different preset temperatures, it is difficult to perform the temperature control if the preset temperatures of the Peltier elements 605a and 605a largely differ. In this third embodiment, however, since the fiber laser light source is used as the fundamental wave light source and it can emit P and S polarized lights having a small difference in oscillation wavelengths, the temperature control for the inside of the wavelength conversion element 603 by the respective Peltier elements 605a and 605b is easily carried out.

Figure 10:
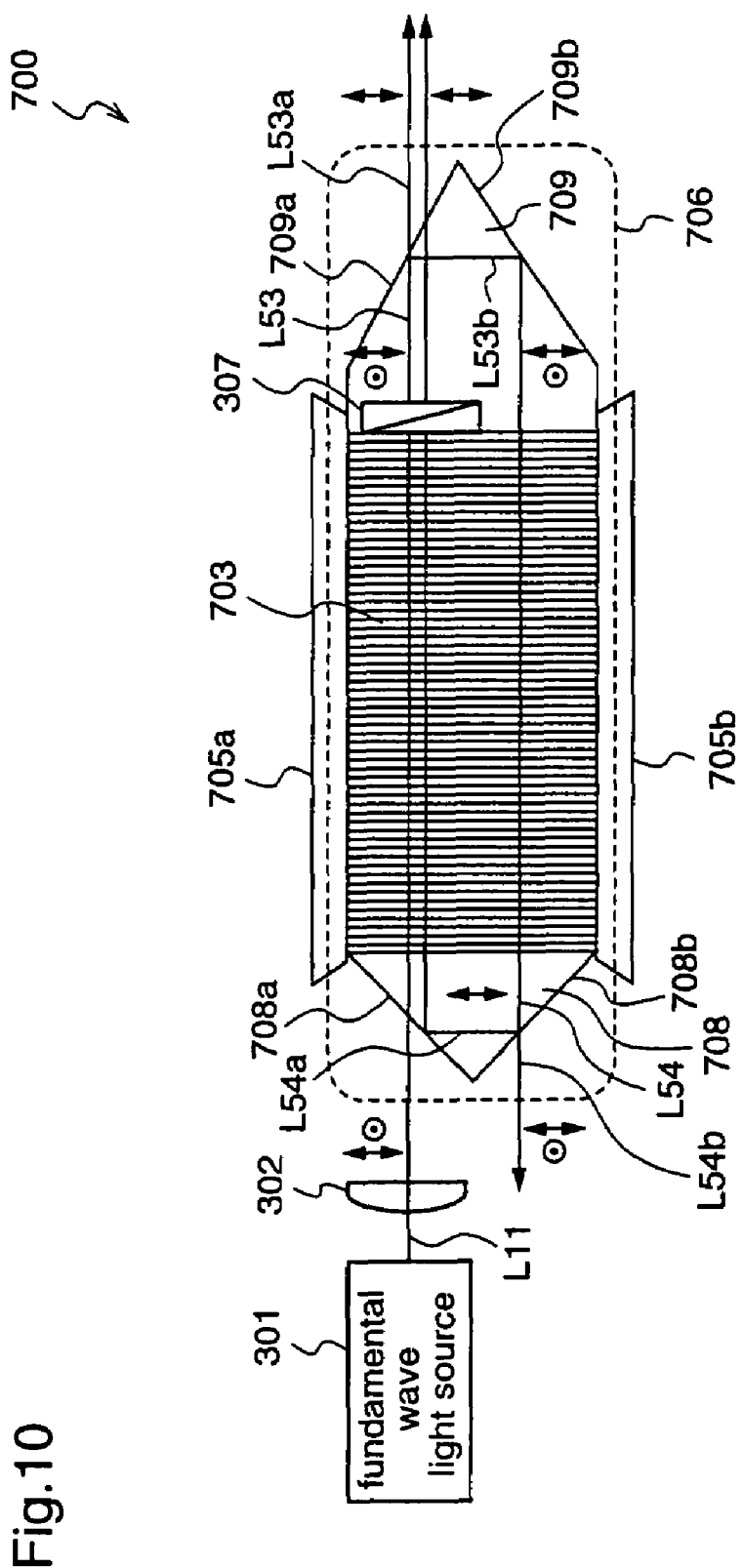
FIG. 10 is a diagram illustrating the construction in which the respective components of the wavelength conversion optical device according to the third embodiment are integrated.

While in the above description the wavelength conversion element 603 and the prisms for folding 608 and 609 are placed separately from each other, the prisms for folding and the crystal of the wavelength conversion element may be unified as shown in FIG. 10. Hereinafter, this construction will be described with reference to FIG. 10.

FIG. 10 is a diagram illustrating the construction of a wavelength conversion optical device having a wavelength conversion element in which the crystal and prisms for folding are unified. Also in FIG. 10, the above-mentioned fiber laser light source 201 is used as the fundamental wave light source 301.

The wavelength conversion element 706 used in this embodiment comprises lithium niobate crystal to which magnesium oxide is doped (Mg:LN), and a polarization inversion part 703, prism parts 708 and 709, and a λ/2 wavelength plate 307 are formed on the substrate. Reflection planes 708a and 708b of the prism part 708 are coated with dielectric multilayer films which transmit the fundamental wavelength and reflect the second harmonic wavelength (green light). Further, reflection planes 709a and 709b of the prism part 709 are coated with dielectric multilayer films which transmit the wavelength of the fundamental wave and reflect the wavelength of the second harmonic wave (green light).

Figure 9:
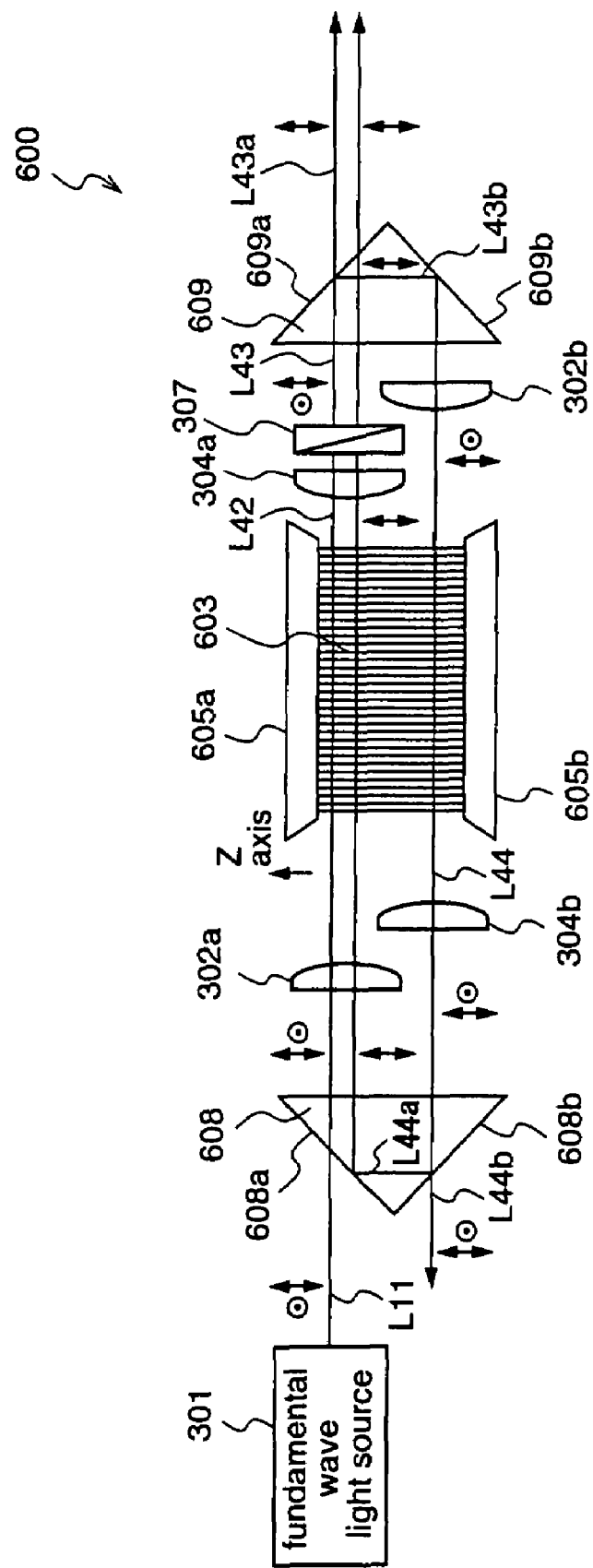
FIG. 9 is a diagram illustrating the construction of a wavelength conversion optical device according to a third embodiment of the present invention.

Further, like the construction shown in FIG. 9, the wavelength conversion element 706 is fixed onto a copper plate, and its temperature is controlled by Peltier elements 705a and 705b that are placed with the polarization inversion part 703 between them. Fine adjustment of the phase matching wavelength is performed by the temperature control of the wavelength conversion element. As in the third embodiment, the polarization inversion part 703 of the wavelength conversion element 706 is sandwiched between the two Peltier elements 705a and 705b to divide the temperature control area in the wavelength conversion element 703 into upper and lower areas, whereby the phase matching wavelengths of the P polarized light and the S polarized light can be matched, respectively. The upper portion of the wavelength conversion element 603 is controlled at about 22° C. by the Peltier element 605a while the lower portion of the element 603 is controlled at about 28° C. by the Peltier element 605b.

Further, in the construction shown in FIG. 10, the condenser lens 302 is disposed outside the wavelength conversion element 706. The focal length of the condenser lens 302 is determined by the length of the optical path that passes through the element 706. For example, even when the length of the element 706 is 10 mm, if the length of the optical path including the folding is 25 mm while the length of the element 706 is 10 mm, the focal length of the condenser lens 302 is desired to be not f=20 mm that is an optimum value for the 10 mm element but f=30 mm that is an optimum value.

The fundamental wave light L11 incident on the wavelength conversion optical device 700 flows until it is wavelength converted into second harmonic waves L53a and L54a, and the output characteristics of the second harmonic waves L53a and L54a emitted from the device 700 are identical to those of the third embodiment, and therefore, repeated description is not necessary.

As described above, in the wavelength conversion optical device according to the third embodiment, the fiber laser light source which outputs the fundamental wave L11 having polarized lights in two directions (P polarized light and S polarized light) that are perpendicular to each other is used as the fundamental wave light source 301, and the fundamental wave L11 is folded by using the prisms for folding 608 and 609 to be incident on the wavelength conversion element 603, and the P polarized wave and the S polarized wave in the fundamental wave L11 are separately wavelength-converted. Therefore, a high-power fundamental wave light which cannot conventionally be incident on the wavelength conversion element because it causes crystal destruction, can be incident on the wavelength conversion element, and consequently, high conversion efficiency can be achieved without crystal destruction. Further, since the wavelength conversion in the later-stage wavelength conversion element 503 is not affected by the former-stage wavelength conversion element 303a, excellent output stability and reliability can be achieved. Further, according to the third embodiment, the device can be significantly reduced in size.

Further, according to the third embodiment, the fiber laser light source 201 having a polarized wave holding fiber is used as the fundamental wave light source 301, the fundamental wave light L11 having the P polarized light and the S polarized light having different wavelengths are emitted from the fundamental wave light source 301, and wavelength conversion is carried out under temperature control by the Peltier elements 605a and 605b that are provided on and beneath the wavelength conversion element 603. Therefore, the wavelength conversion element 603 can reliably perform wavelength conversion for the respective polarized light components of the fundamental wave light L11, and thereby the output stability and reliability of the second harmonic wave can be further improved.

Embodiment 4

While in the third embodiment the second harmonic waves which are independently wavelength-converted in the respective polarization directions (p direction and s direction) with respect to the fundamental wave light by folding the fundamental wave light emitted from the fundamental wave light source using the wavelength conversion element are in the same polarization direction, in this fourth embodiment second harmonic waves having polarization directions that are perpendicular to each other are output.

Figure 11:
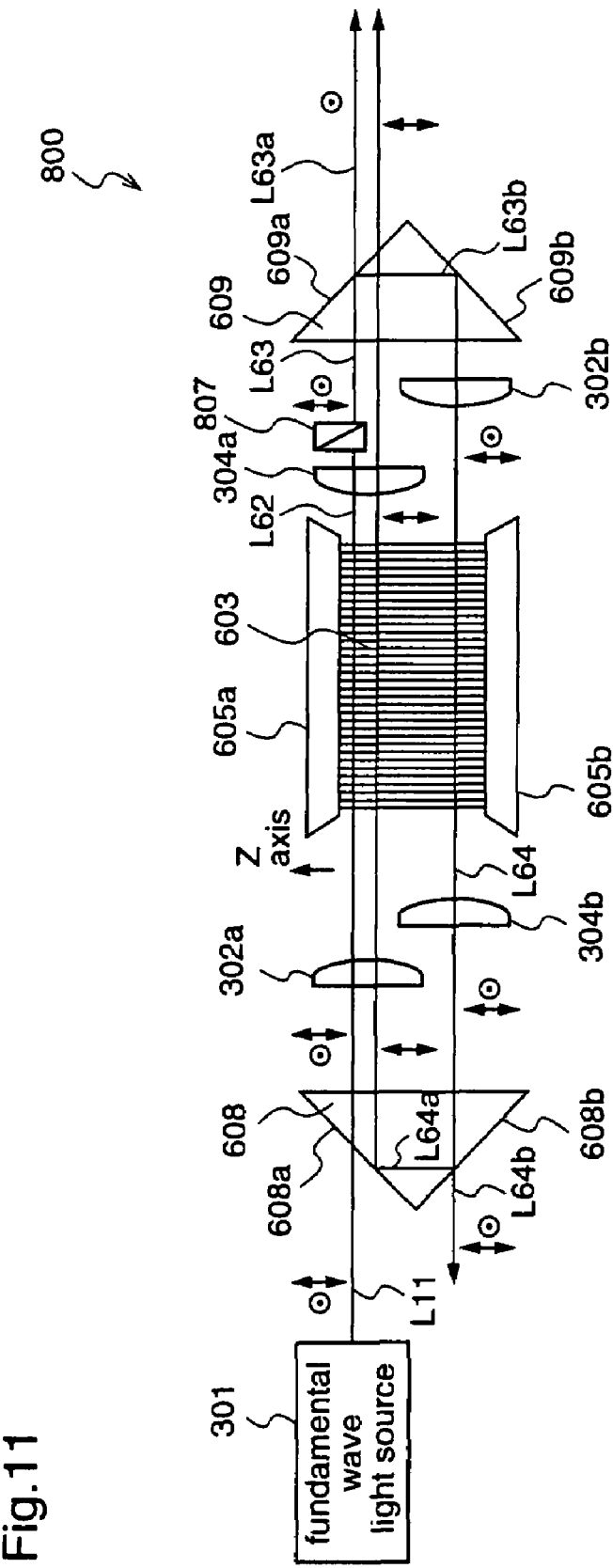
FIG. 11 is a diagram illustrating the construction of a wavelength conversion optical device according to a fourth embodiment of the present invention.

Hereinafter, the construction of the wavelength conversion optical device 800 according to the fourth embodiment will be described with reference to FIG. 11.

In this fourth embodiment, as in the above-mentioned embodiments, the fiber laser light source 201 using the Yb-doped polarized wave holding fiber 205 shown in FIG. 1(a) is adopted as the fundamental wave light source 301, and a quasi phase matching wavelength conversion element in which periodic polarization inversions are formed on lithium niobate crystal to which magnesium oxide is doped (Mg:LN) to prevent deterioration due to light is adopted as a wavelength conversion element. Accordingly, the fundamental wave light L11 emitted from the fundamental wave light source 301 includes a light in a horizontal polarization direction (P polarized light) and a light in a vertical polarization direction (S polarized light) with respect to the wavelength conversion element as in the first embodiment, and further, the oscillation wavelengths of the respective polarized lights are slightly different from each other (refer to FIG. 3).

The construction of the wavelength conversion optical device 800 according to the fourth embodiment is almost the same as the construction of the wavelength conversion optical device 600 according to the third embodiment shown in FIG. 9 except that a fundamental wave/second harmonic wave $\lambda/2$ wavelength plate 807 (hereinafter simply referred to as "second $\lambda/2$ wavelength plate") which rotates both the fundamental wave light and the wavelength-converted second harmonic wave at 90° is disposed in front of the prism for folding 609, instead of the $\lambda/2$ wavelength plate 307 that rotates the fundamental wave at 90° and the second $\lambda/2$ wavelength plate 807 is designed in a small size so that the light (light L64a in FIG. 11) folded back at the reflection plane 608a of the prism for folding 608 is not incident on the second $\lambda/2$ wavelength plate 807. Hereinafter, the details will be described.

Initially, the light L11 (1084 nm: fundamental wave) emitted from the fundamental wave light source 301 passes through the prism for folding 608 and is condensed by the condenser lens 302a into the wavelength conversion element 603. Then, one of the two polarized lights (P polarized light and S polarized light) of the fundamental wave L11, which is parallel to the direction of the dielectric main axis (z axis) of the crystal (P polarized light), is subjected to wavelength conversion.

The respective reflection plates 608a and 608b of the prism 608 are subjected to dielectric multilayer film coatings which transmit the fundamental wavelength and reflect the second harmonic wavelength (green light). Further, in the first wavelength conversion element 603, polarization inversion structures are periodically formed with a period $\Lambda=7.38$ μm on Mg:LN having a thickness of 1 mm and a length of 25 mm (the z axis direction thereof is perpendicular to the inplane of the substrate), and the both ends of the wavelength conversion element 603 are subjected to optical polishing, and further, both the incident end and the emission end are subjected to low reflection coatings for the fundamental wave (wavelength=1084 nm) and the second harmonic waves (wavelength=about 542 nm). Further, the wavelength conversion element 603 is fixed onto a copper plate, and its temperature is controlled by the Peltier elements 605a and 605b which are placed with the wavelength conversion element 603 between them. Fine adjustment of the phase matching wavelength is performed by the temperature control of the wavelength conversion element. Since the wavelength conversion element 603 is sandwiched between the two Peltier elements 605a and 605b and the temperature control area in the wavelength conversion element 603 is divided into upper and lower areas, whereby the phase matching wavelengths of the P polarized light and the S polarized light can be matched, respectively. In this fourth embodiment, the upper portion of the wavelength conversion element 603 is controlled at about 22° C. by the Peltier element 605a while the lower portion of the element 603 is controlled at about 28° C. by the Peltier element 605b.

Accordingly, when the fundamental wave L11 transmits through the reflection plate 608a and is incident on the wavelength conversion element 603, only the fundamental wave of the P polarized light (about 20~30% of the incident fundamental wave light L11 in power conversion) is initially wavelength-converted, resulting in a green light (542 nm) having a wavelength that is half the wavelength of the incident light.

Accordingly, at this time, the wavelength conversion element 603 outputs a light L62 including the green light that is wavelength-converted by the wavelength conversion element 603, the residual fundamental wave light (the residual fundamental wave light of the P polarized light), and the fundamental wave light of the other polarized light (S polarized light) that is not wavelength-converted by the wavelength conversion element 603.

The output light L62 is restored to a collimate light by the recollimator lens 304a, and thereafter, passes through the second λ/2 wavelength plate 807. Since this second λ/2 wavelength plate 807 is arranged so that it rotates the polarization directions of the fundamental wave light of the incident S polarized light and the green light of the wavelength-converted S polarized light to make the polarization directions parallel to the direction of the dielectric main axis (z axis) of the wavelength conversion element 603, the second λ/2 wavelength plate 807 rotates the polarization directions of the fundamental wave light and the second harmonic wave which are included in the output light L62. To be specific, the green light of the P polarized light is changed to the green light of the S polarized light, and the residual fundamental wave light of the P polarized light is changed to the residual fundamental wave light of the S polarized light, and further, the fundamental wave light of the S polarized light is changed to the fundamental wave light of the P polarized light.

The light L63 that has passed through the second λ/2 wavelength plate 807 is incident on the prism for folding 609. The respective reflection plates 609a and 609b of the prism 609 are subjected to dielectric multilayer film coatings which reflect the fundamental wavelength, and transmit the second harmonic wavelength (green light).

Accordingly, when the light L63 is incident on the prism 609, only the converted green light L63a is transmitted and outputted, while the light L63b including the residual fundamental wave light of the S polarized light and the fundamental wave light of the P polarized light that has not been wavelength-converted by the wavelength conversion element 603 is reflected at the reflection plates 609a and 609b of the prism 609 to be folded back toward the wavelength conversion element 603.

Thereafter, the output light L63b is again condensed by the condenser lens 302b into the wavelength conversion element 603. As described above, since only the fundamental wave light of the P polarized light is wavelength-converted in the wavelength conversion element 603, the fundamental wave light of the P polarized light in the light L63b (about 20~30% of the incident light L63b in power conversion) is wavelength-converted, resulting in a green light (542 nm) having a wavelength equal to half the wavelength of the incident light.

Accordingly, at this time, the wavelength conversion element 603 outputs a light L64 including the green light that is wavelength converted by the wavelength conversion element 603, the residual fundamental wave light thereof (the residual fundamental wave light of the P polarized light), and the residual fundamental wave light of the S polarized light.

The output light L64 is incident on the prism 608, and only the fundamental wave, i.e., the light L63b including the residual fundamental wave light of the S polarized light and the fundamental wave light of the P polarized light, is transmitted and outputted through/from the reflection plate 608b of the prism 608, while the green light L63a of the P polarized light is reflected at the reflection planes 608a and 608b of the prism 608 to be folded back toward the wavelength conversion element 603.

The green light L63a of the P polarized light again passes through the wavelength conversion element 603 and the recollimator lens 604a, and thereafter, it is incident on the prism 609 to be transmitted through and outputted from the reflection plate 609a.

As described above, in this fourth embodiment, the green lights of different polarization directions are emitted from the wavelength conversion optical device 800.

Figure 8:
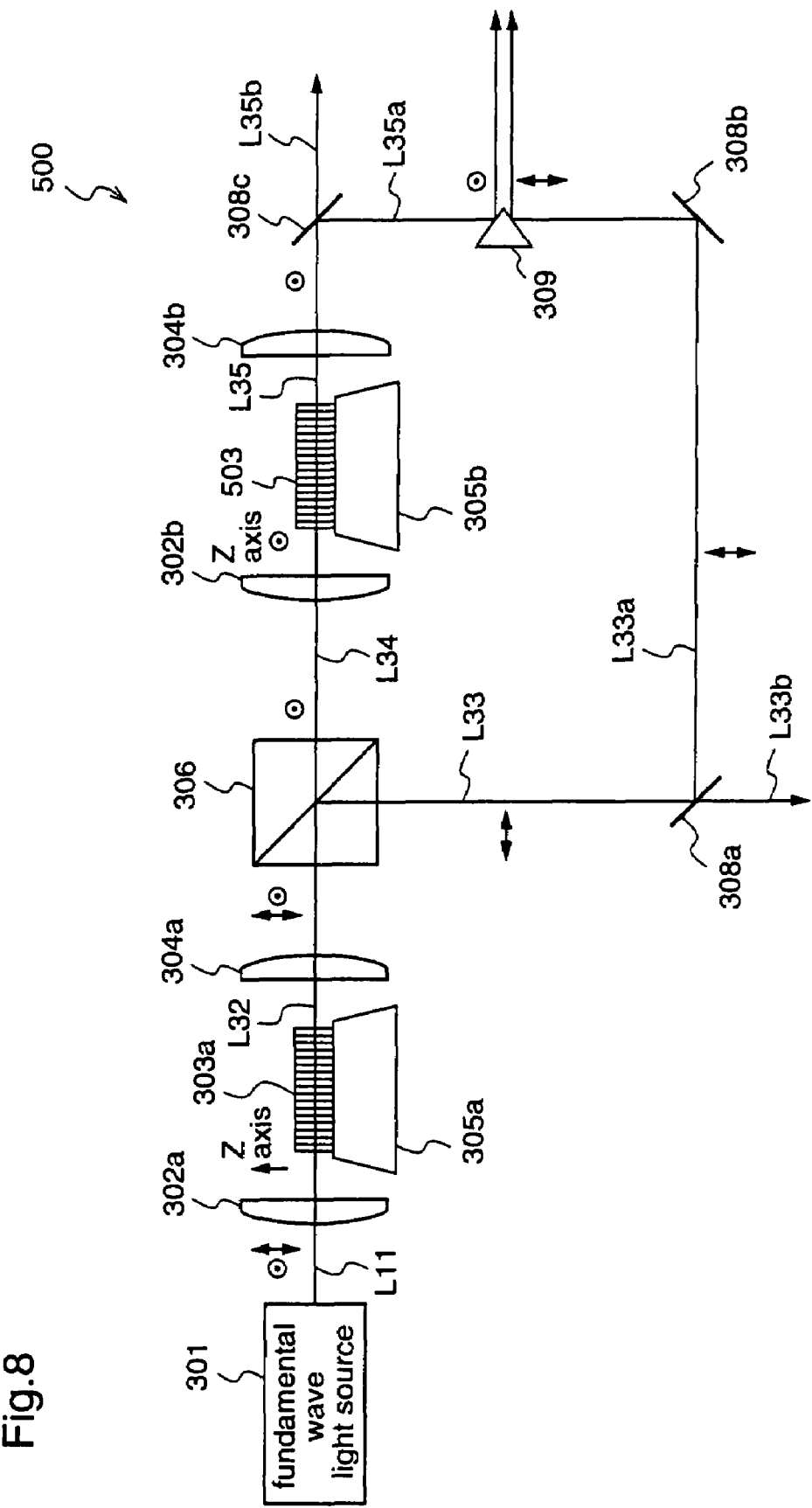
FIG. 8 is a diagram illustrating the construction of a wavelength conversion optical device according to a second embodiment of the present invention.

The output characteristics of the wavelength conversion optical device 800 are approximately equal to the output characteristics (refer to FIGS. 4 and 5) of the wavelength conversion optical device 500 of the second embodiment shown in FIG. 8. That is, in the construction of the fourth embodiment, a fundamental wave light having a high output power which cannot conventionally be incident on the wavelength conversion element because it causes crystal destruction, can be incident on the wavelength conversion element. As a result, even in the state where an output exceeding 3 W (4 W or more) that conventionally causes crystal destruction is obtained by the wavelength conversion element, output saturation of the green light due to the ultraviolet light and crystal destruction can be avoided, thereby realizing high conversion efficiency without crystal destruction. Further, excellent output stability and reliability can be obtained. Furthermore, in this fourth embodiment, as in the third embodiment, the fundamental wave light L11 having the P polarized light and the S polarized light of different oscillation wavelengths is emitted by using, as the fundamental wave light source 301, the fiber laser light source 201 provided with the polarized wave holding fiber, and the fundamental wave light L11 is wavelength-converted under the temperature control by the Peltier elements 605a and 605b provided above and beneath the wavelength conversion element 603. Therefore, the fundamental wave light L11 can be reliably wavelength-converted for each polarized light component in the wavelength conversion element 603, whereby the output stability and reliability of the second harmonic wave can be enhanced as compared with the case where, in the device 800, a randomly polarized fundamental wave light having a single oscillation wavelength is emitted and wavelength-converted for each polarized light component by the wavelength conversion element 603.

While in the above description the wavelength conversion element 603 and the prisms for folding 608 and 609 are placed separately from each other, the prisms for folding and the crystal of the wavelength conversion element may be unified as described for the third embodiment using FIG. 10. In this case, the wavelength conversion optical device can be further reduced in size.

While in the above-mentioned embodiments a green light (542 nm) is generated from an infrared light (1084 nm), the present invention is not restricted thereto. It is possible to generate lights from a yellow-green light (560 nm) to a blue light (480 nm) by varying the wavelength of the fundamental wave to be emitted from the fiber laser light source.

Further, while in the above-mentioned embodiments a fiber laser light source is used as the fundamental wave light source 301, the present invention is not restricted thereto. It is possible to generate lights from a yellow-green light (560 nm) to a near-ultraviolet light (380 nm) by using other light sources.

Further, while in the above-mentioned embodiments lithium niobate to which magnesium oxide (MgO) is doped (Mg:LiNbO$_3$) is used as the wavelength conversion element, it is also possible to use non-doped lithium niobate (LiNbO$_3$: LN), non-doped lithium tantalate (LiTaO$_3$:LT), lithium niobate to which ZnO is doped (Zn:LiNbO$_3$), lithium tantalate to which MgO~ZnO are doped (Mg:LiTaO$_3$, Zn:LiTaO$_3$), titanyl potassium phosphate (KTiOPO$_4$:KTP), rare-earth calcium oxyborate (ReCa$_4$O(BO$_3$)$_3$, Re: rare-earth element), or crystal. However, as described for the wavelength conversion optical devices according to the respective embodiments, when lights from a yellow-green light (560 nm) to a blue light (480 nm) are generated from the fundamental wave light L11 emitted from the fiber laser light source, it is most desirable to use MgO-doped lithium niobate (Mg:LiNbO$_3$) in view of the conversion efficiency and the resistance to deterioration of crystal due to light.

By the way, since the fiber laser light source is used as the fundamental wave light source in the wavelength conversion optical devices according to the respective embodiments, the oscillation wavelengths of the respective polarized lights are slightly different from each other, and therefore, second harmonic waves of plural wavelengths can be obtained by performing wavelength conversion for the respective wavelengths. Accordingly, when the wavelength conversion optical device according to any of the above-mentioned embodiments is used as a laser display (image display device) or a light source for exposure in semiconductor processes, it is possible to reduce unnecessary noise patterns (speckle noises) which are caused by that the coherency of light (that the light is of a single wavelength and of same phase) is large more than necessary.

Hereinafter, a description will be given of an example of a construction in the case where the wavelength conversion optical device described for the first embodiment is used as a laser display (image display optical device).

Embodiment 5

Figure 12A:
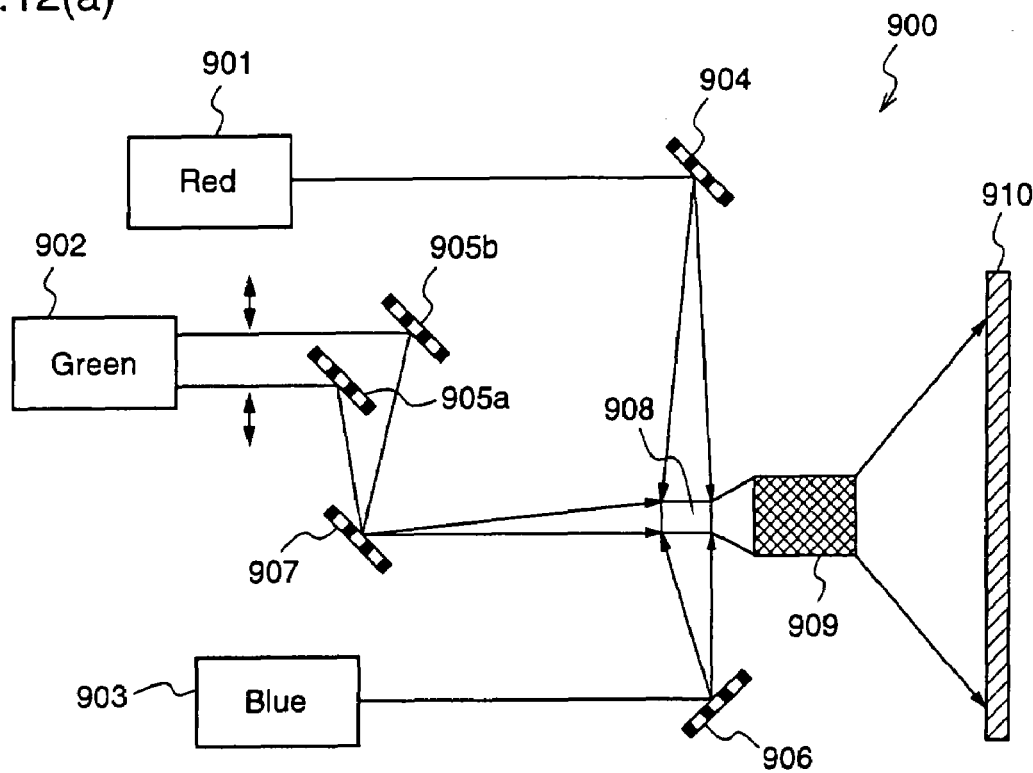
FIG. 12 is a diagram illustrating an example of an image display device using the wavelength conversion optical device according to the present invention.
Figure 12B:
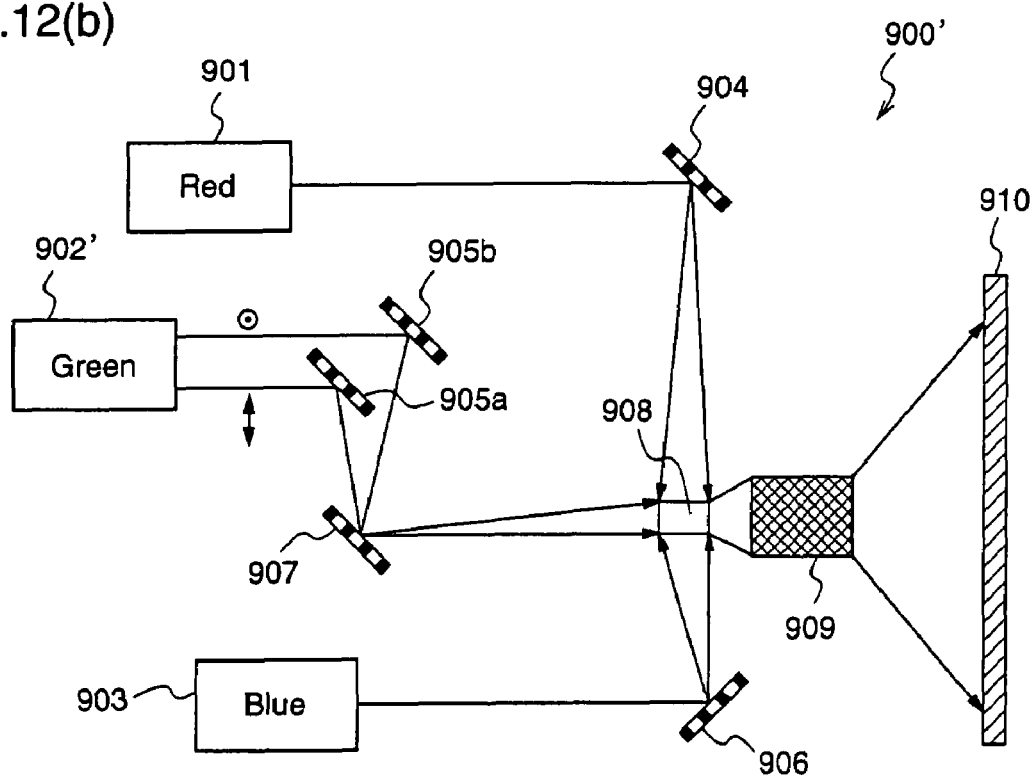

FIG. 12(*a*) is a diagram illustrating the construction of a laser display using, as a green light source, a wavelength conversion optical device which emits two second harmonic waves in the same polarization direction.

In this fifth embodiment, laser light sources of red, green, and blue are used as light sources of the laser display 900.

To be specific, a GaAs series semiconductor laser having a wavelength of 635 nm is used as a red light source 901, and a GaN series semiconductor laser having a wavelength of 445 nm is used as a blue light source 903. Each semiconductor laser is constituted such that outputs of three to eight semiconductor lasers can be combined as a single fiber output by using a band fiber, and the wavelength spectrum width thereof is as broad as several nanometers. This broad spectrum suppresses occurrence of speckle noise.

On the other hand, the wavelength conversion optical device 300 described for the first embodiment is used as a green light source 902.

The two green lights (second harmonic waves) of the P polarized lights having different wavelengths, which are emitted from the green light source 902, are sent to the reflection type modulation elements 905*a* and 905*b*, and subjected to spatial modulation. Then, the spatial-modulated lights are reflected at a mirror 907 and mixed with the red light and the blue light that are respectively modulated by modulation elements 904 and 906, by a multiplexing prism 908, thereby forming a color image. Thus formed image is projected onto a screen 910 by a projection lens 909.

In this way, the two green lights of different wavelengths are emitted from different positions of the green light source 902, and the respective green lights of different wavelengths are spatial-modulated by the modulation elements 905*a* and 905*b*, respectively, whereby resolution of the green light for which the sensitivity of human eye is high can be enhanced, resulting in improvement in the image quality of the image display optical device.

Figure 13:
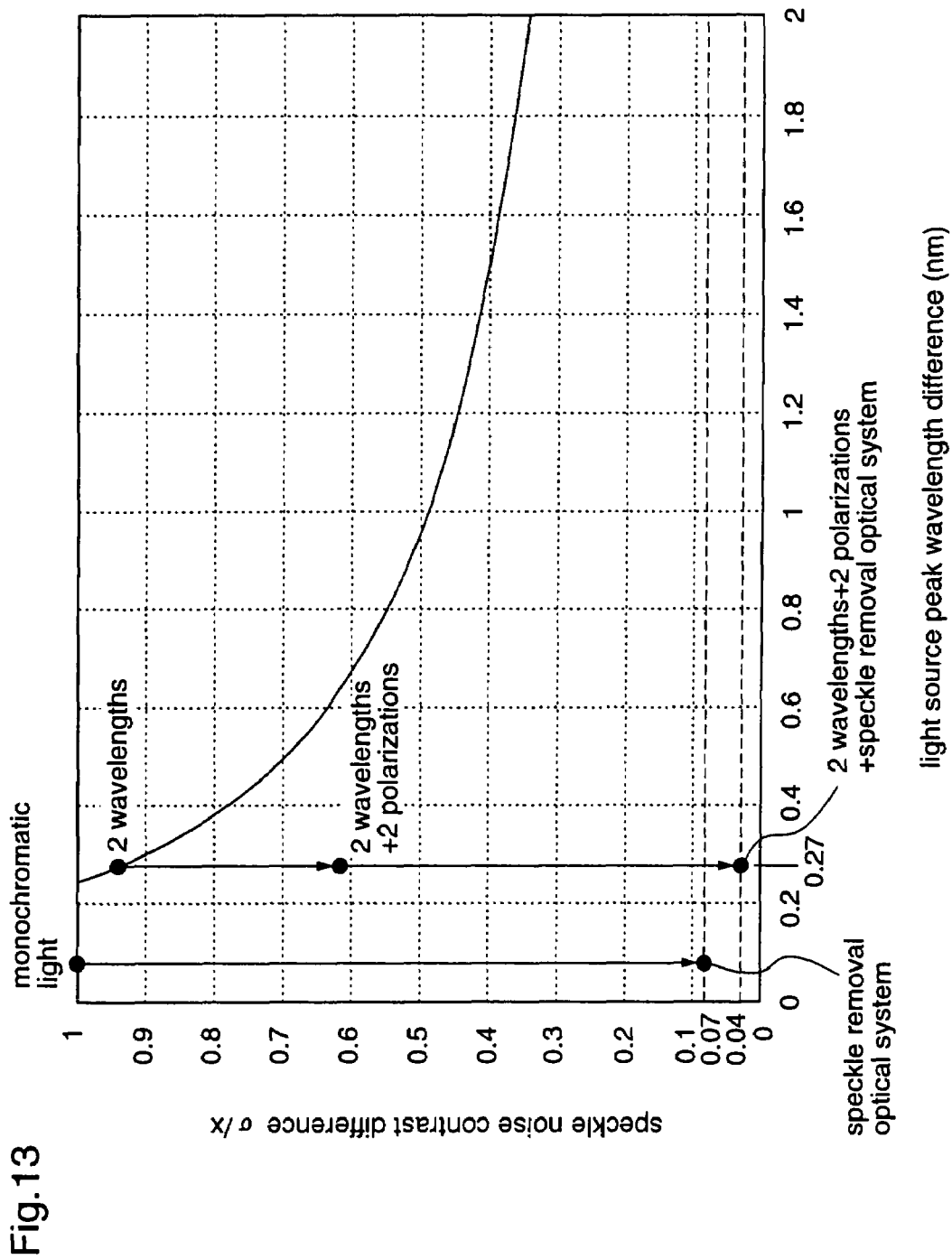
FIG. 13 is a diagram illustrating the relationship between a peak wavelength difference obtained when two lights of different wavelengths are emitted from a light source, and a speckle noise contrast difference.

FIG. 13 is a diagram illustrating the relationship between a difference in peak wavelengths of two lights emitted from a laser light source, and a difference in speckle noise contrasts. In FIG. 13, "monochromatic" means the case where a light of single wavelength and single polarization is emitted from the light source, and the speckle noise contrast difference in this case is "1" in FIG. 13. Further, in FIG. 13, the results of comparison on the same screen are plotted.

As shown in FIG. 13, when the light emitted from the conventional laser light source is a monochromatic light, even when the image display optical device is provided with a speckle removal optical system (not shown), the speckle noise contrast difference is reduced to only 0.07~0.08 at most. However, when the two light beams having different wavelengths are emitted from the laser light source as in the present invention, the speckle noise contrast difference can be reduced relative to the case of using the monochromatic light, even when a speckle removal mechanism using a vibration diffusion plate having a simpler construction is adopted as the speckle removal optical system.

Further, speckle noise is characterized by that it has different patterns depending on polarization of light. Accordingly, when a wavelength conversion optical device (e.g., one shown in the second embodiment) that emits different polarized lights is used as a laser light source as shown in FIG. 12(*b*), different speckle noises are overlapped on the image projecting surface, whereby unnecessary noise patterns (speckle noise) can be further reduced.

To be specific, as shown in FIG. 13, when the light emitted from the conventional laser light source is a monochromatic light, even if the image display optical device is provided with a speckle removal optical system (not shown), the speckle noise contrast difference is reduced to only 0.07~0.08 at most. However, when the laser light source is constituted so as to emit two lights having different wavelengths and different polarizations, the speckle noise contrast difference can be significantly reduced relative to the case of using the monochromatic light, and further, when a speckle removal optical system (not shown) is provided, the speckle noise contrast difference can be reduced to a level of about 0.04 which is invisible to the naked eye (when the wavelength difference is 0.27 nm).

While in this fifth embodiment a front projection type image display optical device which projects an image from the front surface of the screen is described, a rear projection type image display optical device which projects an image from the rear surface of the screen may be employed.

Further, while in FIG. 12 a reflection type spatial modulation element on which microminiature mirrors are integrated is adopted as the spatial modulation element, it is also possible to adopt a modulation element using liquid crystal or a galvano mirror.

The constructions shown in the respective embodiments mentioned above are merely examples, and it is needles to say that the present invention can adopt other embodiments.

APPLICABILITY IN INDUSTRY

The present invention is useful for realizing a wavelength conversion optical device, a laser light source, and a high-definition image display optical device, which have high reliability and high output stability.

The invention claimed is:

1. A wavelength conversion optical device including:
   a fundamental wave light source for outputting a fundamental wave light; and
   a wavelength conversion mechanism including a polarization inversion unit for wavelength-converting the fundamental wave light emitted from the fundamental wave light source to generate harmonic waves;

wherein said fundamental wave light source is a fiber laser light source which outputs a fundamental wave light having polarized light components in two directions perpendicular to each other, said polarized light components having different wavelengths; and said wavelength conversion mechanism wavelength-converts the fundamental wave light for each of the polarized light components in the two directions perpendicular to each other.

2. A wavelength conversion optical device as defined in claim 1 wherein an oscillation wavelength of the fundamental wave light differs between the polarized light components in the two directions.

3. A wavelength conversion optical device as defined in claim 1 wherein the two harmonic wave lights emitted from the wavelength conversion mechanism have the same polarization direction.

4. A wavelength conversion optical device as defined in claim 1 wherein the two harmonic wave lights emitted from the wavelength conversion mechanism have polarization directions that are perpendicular to each other.

5. A wavelength conversion optical device as defined in claim 1 further including a polarized light separation mechanism for separating the fundamental wave light, or a light including the fundamental wave light and the harmonic wave lights that are wavelength-converted by the wavelength conversion mechanism, for each of the polarized light components of the light.

6. A wavelength conversion optical device as defined in claim 1 wherein said wavelength conversion mechanism includes, on the same substrate of the wavelength conversion mechanism, the polarization inversion unit, a first reflection mirror which is placed on a fundamental wave light incident side of the polarization inversion unit and transmits the fundamental wave light, a second reflection mirror which is provided on an emission side of the harmonic waves that are wavelength-converted by the polarization inversion unit and transmits the harmonic waves, a wavelength plate which converts the polarization of the fundamental wave that has passed through the polarization inversion unit, and two temperature control mechanisms which perform temperature control for the polarization inversion unit.

7. A wavelength conversion optical device as defined in claim 1 wherein the polarization inversion unit of the wavelength conversion mechanism is formed by polarization-inverting at least a portion of lithium niobate ($LiNbO_3$:LN) or lithium tantalate ($LiTaO_3$:LT) to which MgO or ZnO are doped.

8. An image display optical device including:
a wavelength conversion optical device as defined in claim 1;
modulation mechanisms for modulating the two harmonic waves that are converted and emitted by the wavelength conversion optical device, respectively; and
a projection optical system for projecting the lights modulated by the modulation mechanisms.

9. A laser light source having a wavelength conversion optical device as defined in claim 1.

10. A wavelength conversion optical device as defined in claim 1 wherein, in a light emitted from the device, beams having respective wavelength components are not emitted coaxially to each other.

11. An image display optical device having a wavelength conversion optical device as defined in claim 10.

* * * * *